United States Patent [19]

Atobe et al.

[11] Patent Number: 5,999,306

[45] Date of Patent: Dec. 7, 1999

[54] METHOD OF MANUFACTURING SPATIAL LIGHT MODULATOR AND ELECTRONIC DEVICE EMPLOYING IT

[75] Inventors: Mitsuro Atobe; Hiroshi Koeda; Shinichi Yotsuya, all of Suwa, Japan

[73] Assignee: Seiko Epson Corporation, Tokyo, Japan

[21] Appl. No.: 08/756,463

[22] Filed: Nov. 26, 1996

[30] Foreign Application Priority Data

Dec. 1, 1995 [JP] Japan ..................................... 7-337877
Feb. 29, 1996 [JP] Japan ..................................... 8-043603

[51] Int. Cl.$^6$ ................................................. G02B 26/08
[52] U.S. Cl. ........................ 359/295; 359/223; 359/291; 359/298
[58] Field of Search ................................... 359/223, 224, 359/290, 291, 295, 298, 855

[56] References Cited

U.S. PATENT DOCUMENTS

| 4,566,935 | 1/1986 | Hornbeck | 359/295 |
| 4,710,732 | 12/1987 | Hornbeck | 359/295 |
| 5,083,857 | 1/1992 | Hornbeck | 359/295 |
| 5,784,190 | 7/1998 | Worley | 359/291 |
| 5,835,256 | 11/1998 | Huibers | 359/291 |

FOREIGN PATENT DOCUMENTS

| 4-230722 | 8/1992 | Japan . |
| 5-188308 | 7/1993 | Japan . |
| 5-196880 | 8/1993 | Japan . |

OTHER PUBLICATIONS

"Nikkei Microdevices", Mar. 1994; News Probe, Conference Preview; pp. 90–93.

Proceedings of the IEEE, vol. 70, No. 5, May 1982; "Silicon as a Mechanical Material"; pp. 420–457.

*Primary Examiner*—Georgia Epps
*Assistant Examiner*—Margaret Burke
*Attorney, Agent, or Firm*—Eric B. Janofsky

[57] ABSTRACT

A spatial light modulator is constructed from a conductive silicon mirror substrate and a glass electrode substrate including sodium, anode-bonded together. The silicon mirror substrate has micromirrors arranged in a matrix, torsion bars coupling these micromirrors in the x-direction, and a frame coupled to both ends of the torsion bars. A glass electrode substrate has a central depression, a rim around the periphery thereof, pillars projecting from within the depression, and electrodes and wiring driving micromirrors formed within the depression in an inclining manner. Both ends of the torsion bars are bonded to the rim of the frame portion, and intermediate portions of the torsion bars are bonded to the pillars. Both ends of the torsion bars are cut away from the frame portion during dicing.

15 Claims, 29 Drawing Sheets

FIG.4A
FIG.4B
FIG.4C
FIG.4D
FIG.4E
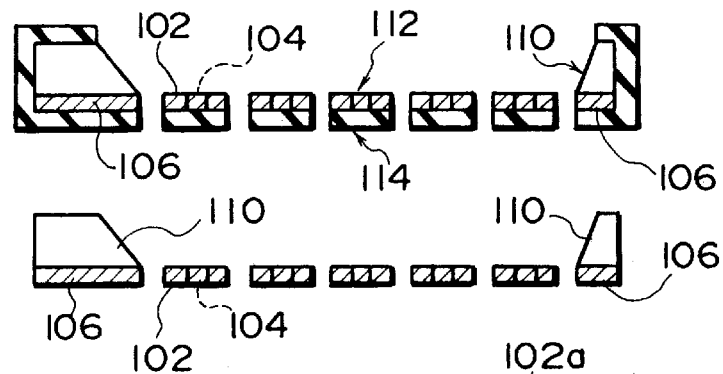
FIG.4F
FIG.4G
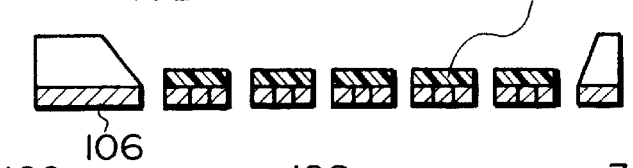
FIG.4H
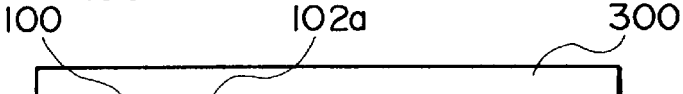
FIG.4I
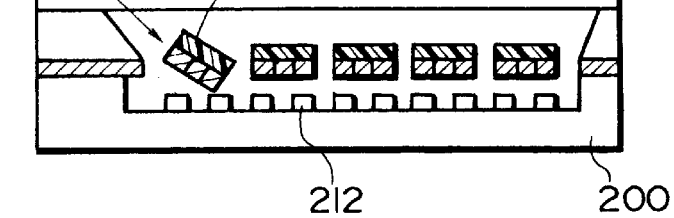

PRIOR ART

PRIOR ART
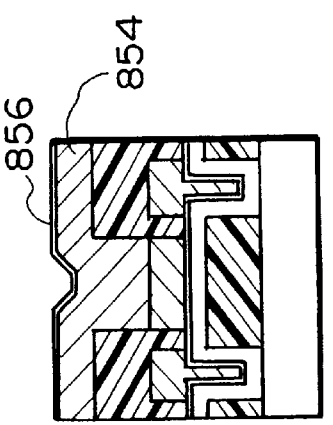
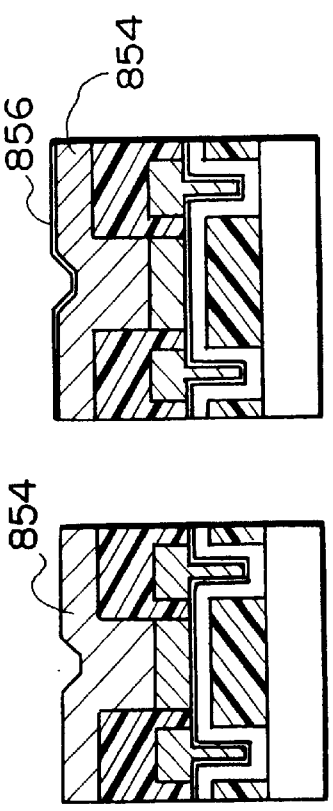
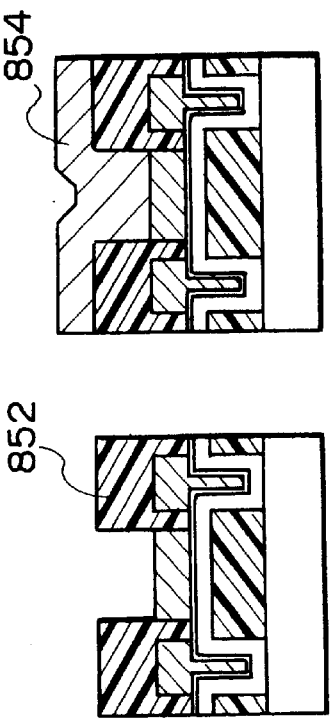
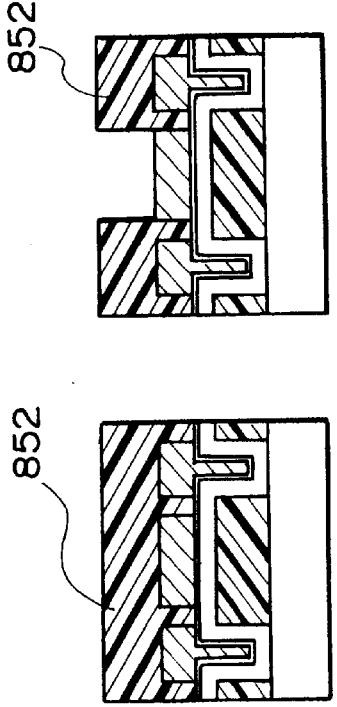
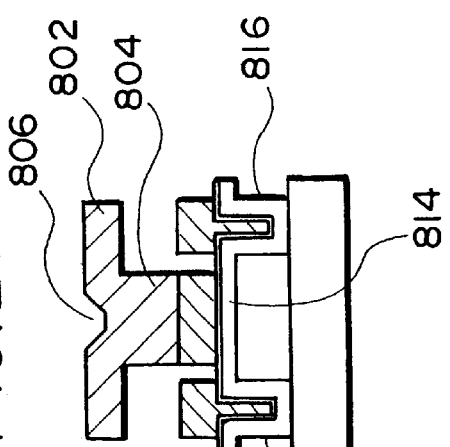
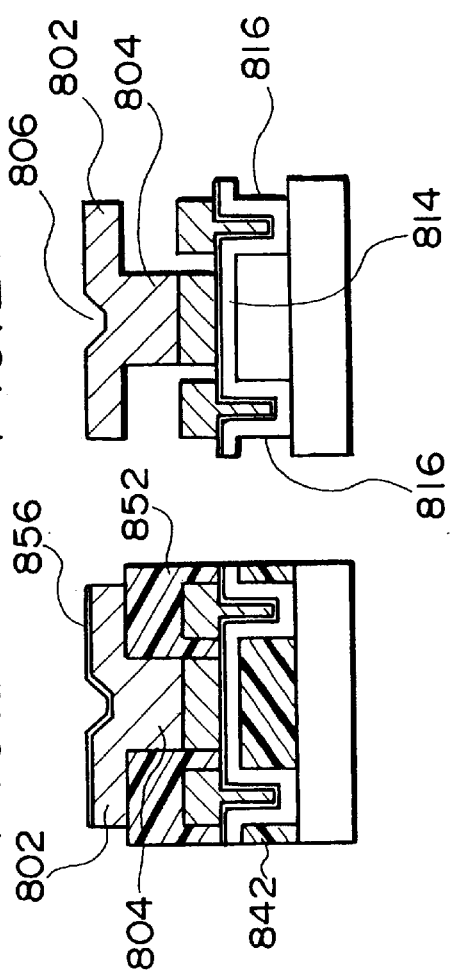

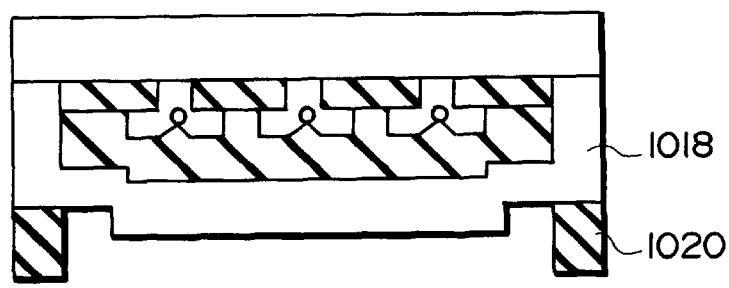
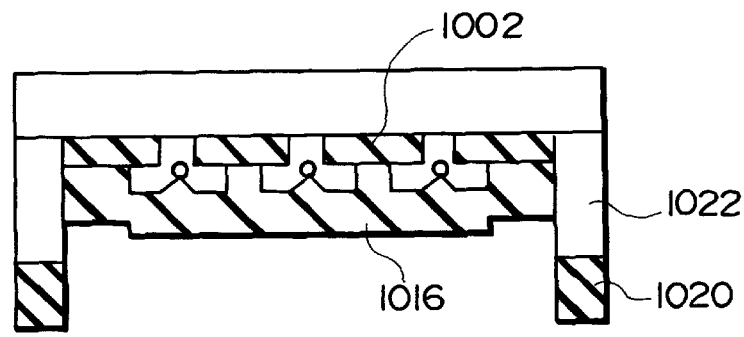
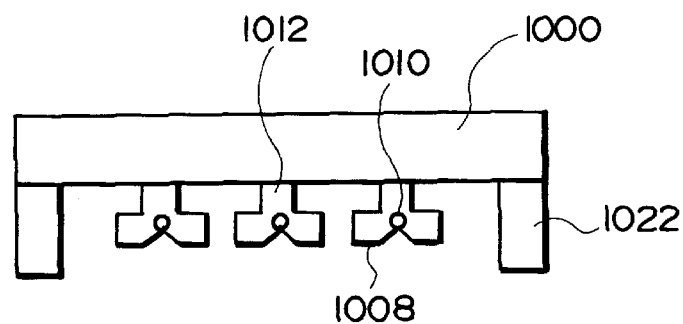
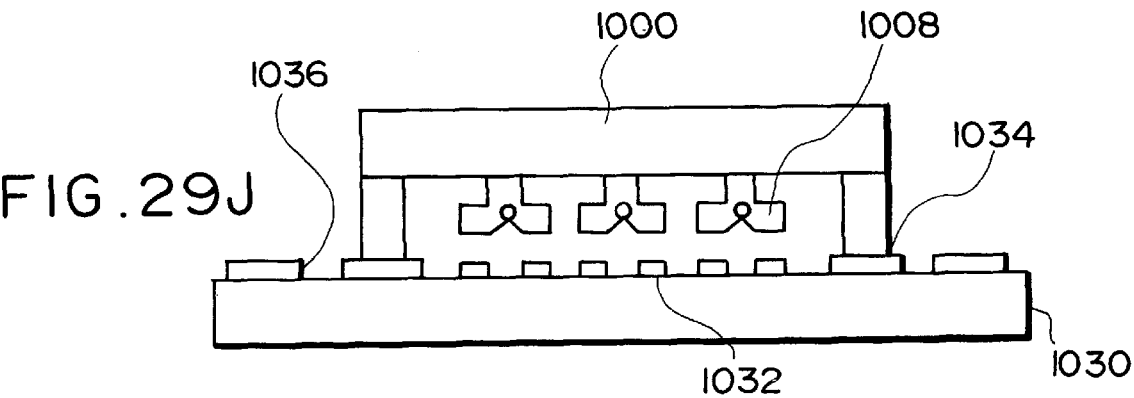

METHOD OF MANUFACTURING SPATIAL LIGHT MODULATOR AND ELECTRONIC DEVICE EMPLOYING IT

BACKGROUND OF THE INVENTION

1. Field of the Invention

The present invention relates to a method of manufacturing spatial light modulator and electronic device employing it.

2. Description of Prior Art

This type of spatial light modulator is disclosed, for example Japanese Patent Application Laid-Open Nos. 4-230722, 5-188308, and 5-196880. An improved form of these devices is also described in the March 1994 issue of "Nikkei Microdevice" as a "DMD" (Digital Micromirror Device).

This DMD has, as shown in FIG. 22, a three-layer construction comprising an upper layer 800, an intermediate layer 810, and a lower layer 830.

The upper layer 800 comprises a mirror 802 and a mirror support post 804 joined to the center of the lower surface of the mirror 802. In connection with the fabrication process of the mirror 802, in a position opposite to the mirror support post 804 is formed a depression 806.

The intermediate layer 810 has a mirror support plate 812 which is coupled to the mirror support post 804, and which is supported at opposite ends by hinges 814 so as to be able to be driven in an inclining manner. To provide the space for this mirror support plate 812 for driving in an inclining manner, the hinges 814 have on their lower sides hinge support posts 816.

The intermediate layer 810 further is provided with first and second address electrodes 818 and 820 on opposing sides of the hinges 814, each supported by electrode supporting posts 826. Furthermore, outside this are provided a first mirror contact electrode 822 and second mirror contact electrode 824, each supported by electrode supporting posts 826.

The lower layer 830 comprises four electrodes 832a to 832d coupled to the electrode supporting posts 826 of the first and second address electrodes 818 and 820, and a common electrode 834 coupled to the first and second mirror contact electrodes 822 and 824.

This DMD, as shown in FIG. 23, has a bias voltage Va applied to the mirror 802 and the first and second mirror contact electrodes 822 and 824. Then when for example a negative voltage is applied to the first address electrode 818, and a positive voltage is applied to the second address electrode 820, a Coulomb force acts between the mirror 802 and the first address electrode 818, and the mirror 802 is driven to an inclined position as shown by the dot-dash line in FIG. 23. By reversing the polarity of the voltage applied to the first and second address electrodes 818 and 820, an inclined position as shown by the dot-dot-dash line in FIG. 23 can be established.

The inclined position of the mirror 802 shown by a dot-dash line in FIG. 23 is taken to be the "ON" position in which light is reflected toward a certain position, and the inclined position shown by a dot-dot-dash line is taken to be the "OFF" position in which light is reflected in a different direction. By varying the time between switches, a 256-gradation display can be obtained.

The DMD shown in FIG. 22 is hypothetically manufacturable by a fabrication process as shown in FIGS. 24A to 24H and FIGS. 25A to 25F. FIGS. 24A to 24H show the steps in the formation of the intermediate layer 810 on an already formed lower layer 830, and FIGS. 25A to 25F show the steps in the formation of the upper layer 800 on the intermediate layer 810, and the formation of the interlayer spaces.

As shown in FIG. 24A, a substrate 840 on which an SRAM (static random access memory) is formed as the lower layer 830 is provided. Next, as shown in FIG. 24B, a resist 842 is coated on this substrate 840, and in the stage shown in FIG. 24C a pattern corresponding to the hinge support posts 816 and electrode supporting posts 826 is formed.

As shown in FIG. 24D, an aluminum (Al) film is formed by vapor deposition over the surface of the resist 842 and trench portion, and then further as shown in FIG. 24E an aluminum oxide film 846 is formed over the surface.

Further after vapor deposition of an aluminum film 848 as shown in FIG. 24F, as shown in FIG. 24G a resist 850 is applied in a pattern. Thereafter, as shown in FIG. 24H, the aluminum film 848 is etched, whereby mirror support plate 812, hinges 814, and hinge support posts 816 are formed.

By the process shown in FIGS. 25A to 25F, the upper layer 800 shown in FIG. 22 is formed. For this purpose, as shown in FIG. 25A a resist 852 is applied thickly, and is formed in a pattern as shown in FIG. 25B. Further, an aluminum film 854 is formed by vapor deposition, and after an aluminum oxide film 856 is formed over a part of the surface thereof, the extremities of the aluminum film 854 are removed by etching, whereby the mirror 802 and mirror support post 804 are formed. (See FIGS. 25C to 25E.)

Finally, as shown in FIG. 25F, by removing the resist 842 and 852, a space between the upper layer 800 and intermediate layer 810 is formed, and moreover a space between the intermediate layer 810 and lower layer 830 is formed.

However, in the above process, there is the problem that the DMD cannot be obtained with a high yield. One reason for this is that the factor determining the angle of inclination of the mirror 802, that is, the distance between the lower surface of the mirror 802 and the mirror contact electrodes 822 and 824 depends on the thickness of the resist 852 in the resist step shown in FIG. 25A.

In general, such a resist is formed by the spin coating method, and while it is difficult in itself to improve the uniformity of a resist layer thickness, when the spin coating method is used it is extremely difficult to make the resist 852 of a uniform thickness.

Moreover, in the conventional spin coating method, the larger the surface area of the wafer, the more difficult it is to ensure uniformity within the area of the resist film, and further to make the thickness of the resist film constant is for a large diameter semiconductor wafer almost impossible. Thus, it is difficult to form a plurality of devices simultaneously from a single semiconductor wafer, and the throughput is reduced.

In addition to the above problems, a further one is that in the stage of removing the resist shown in FIG. 25F, it is difficult to completely remove the resist from the furthest recesses of the underside of the mirror 802 and hinges 814. If foreign objects are thus left behind, the mirror 802 and address electrodes 818 and 820 may short-circuit, or the inclination of the mirror may be obstructed, or the mirror contact electrodes 822 and 824 and address electrodes 818 and 820 may short-circuit.

Another problem with the above described construction of a DMD is that the depression 806 is formed in the center region of the mirror 802. In the aluminum vapor deposition step of FIG. 25C, when aluminum is vapor deposited in the trench portion, the position opposing this trench is inevitably concave, and the forming of the depression 806 cannot be prevented.

In this three-layer DMD, since the hinges 814 are not in the same plane as the mirror 802, the exposed surface area of the mirror 802 is increased, and the benefit is obtained of an increased light utilization ratio.

However, since the depression 806 is formed in the center of the large area mirror 802, with this depression 806 in the line of a powerful beam of light, the light utilization ratio is actually reduced by the diffuse reflection. Alternatively, the diffusely reflected light may be input as information pertaining to another pixel, resulting in the problem of reduced image quality. Moreover, even if the side walls of the depression 806 are processed so as to be vertical, the area which is optically effective is reduced.

A further problem is that the above described spatial light modulator is formed on a substrate 840 on which an SRAM is formed, and the overall yield is the product of the yield of the SRAM and the yield of the spatial light modulator, which is thus considerably low.

Another prior art is the spatial light modulator described in Petersen, "Silicon as a Mechanical Material₀ Proceedings of the IEEE, Vol. 70, No. 5, May 1982, in FIGS. 39, 40 and 41 on pages 442 and 448. In order to fabricate this, a silicon substrate which has been cut and ground on both sides is used, and a micromirror is formed on this silicon substrate by photolithography and etching processes. The silicon substrate on which this micromirror is formed and a glass plate on which a metal electrode film is formed are bonded by the anode bonding method, and a spatial light modulator thus manufactured.

By this method, however, in order to cut and grind the silicon substrate on both sides, and thus determine the substrate thickness, it is not possible to obtain a thickness less than 200 μm. This is because grinding to a thickness less than this leads to breakage of the silicon substrate. The thickness of the micromirror is therefore at least 200 μm, and the inertial moment due to this heavy mass is thus great, making rapid response and high resolution display impossible.

SUMMARY OF THE INVENTION

It is the object of the present invention to provide a spatial light modulator equipped with micromirrors which can be fabricated with a high yield, a method for manufacturing the same, and an electronic device employing the spatial light modulator.

Another object of the present invention is to provide a spatial light modulator equipped with micromirrors which allows accurate control of spatial light modulation without the generation of diffuse reflection on the surface of the micromirrors, a method for manufacturing the same, and an electronic device employing the spatial light modulator.

Yet a further object of the present invention is to provide a spatial light modulator for which the yield is high, and for which a moving-picture gradation display is easy, a method for manufacturing the same, and an electronic device employing the spatial light modulator.

The method of the present invention pertains to fabricating a spatial light modulator having micromirrors, by bonding together a conductive silicon mirror substrate and an electrode substrate. The conductive silicon mirror substrate has a plurality of micromirrors arranged in one of a line and in matrix and a torsion bar coupling the micromirrors in one direction, and a reflective layer is formed at least on one surface of the micromirrors.

The electrode substrate has a depression in a central region, a rim around the periphery thereof, a set of electrodes having conducting layers disposed within the depression in positions corresponding to the micromirrors, and driving the micromirrors in an inclining manner by means of a Coulomb force, and pillars projecting from the depression in positions corresponding to the interval between two of the micromirrors adjacent in the one direction.

In the step of bonding together the conductive silicon mirror substrate and the electrode substrate, at least intermediate portions of the torsion bar on the silicon mirror substrate are opposite to the pillars of the electrode substrate.

In this way, if the depression in the glass electrode substrate is previously formed with a depth of high accuracy, the deflection angle of the micromirrors can be determined accurately from lot to lot. Furthermore, the reflective layer formed on the surface of the micromirrors can be made uniform, and a surface with no diffuse reflection can be formed.

In particular, when for example the electrode substrate is employed a glass electrode substrate including an alkali metal such as sodium, the substrates can be bonded using anode bonding. This means that no adhesive layer is required between the substrates, and thus the deflection angle of the micromirrors can be determined accurately from lot to lot.

It should be noted that the bonding method is not, however, restricted to anode bonding, and direct bonding or diffusion bonding can also be used, and more detailed description of the bonding method is given below. Furthermore, if heat is applied in the bonding process, the material of the electrode substrate should preferably be a material with a coefficient of thermal expansion close to that of silicon.

On the silicon mirror substrate, a frame portion to which both ends of the torsion bar are coupled may be formed. In this case, the frame portion and both ends of the torsion bar are bonded to the rim of the electrode substrate. In addition, after this bonding, a step of cutting away both ends of the torsion bar from the frame portion.

By this means, the mutual positional relationship of a plurality of torsion bars is maintained by the frame, and therefore without precisely positioning each torsion bar the mutual positional relationship between them can be maintained during bonding to the electrode substrate.

The process of step of fabricating the silicon mirror substrate may comprise the steps of:

doping a silicon substrate with impurities to form a doped layer;

patterning a first mask for forming a window on one surface of said silicon substrate and a second mask for forming said plurality of micromirrors and said at least one torsion bar on the other surface of said silicon substrate;

etching said silicon substrate until said doped layer is exposed using said first mask;

a step of etching said doped layer using said second mask;

removing said first and second masks and forming said plurality of micromirrors and said at least one torsion bar from said doped layer; and forming said reflective layers on one surface of said micromirrors of said doped layer.

In another aspect of the present invention, before the silicon mirror substrate is completed, while in the form of a silicon substrate, it is bonded with the electrode substrate.

The electrode substrate has a depression in a central region, a rim around the periphery thereof, a set of electrodes having conducting layers disposed within the depression in positions corresponding to the micromirrors, and driving the micromirrors in an inclining manner by means of a Coulomb force, and pillars projecting from the depression in positions corresponding to the interval between two of the micromirrors adjacent in one direction.

Bonded to this is a silicon substrate on one surface of which is formed a doped layer doped with impurities. At this time, at least the pillars of the electrode substrate and the doped layer are opposite and bonded.

In this step, since the step is carried out before the micromirrors are formed, positioning for the bonding operation is simple.

Thereafter, the silicon substrate is etched to remove same, leaving the doped layer, and a reflective layer is formed on the surface of the doped layer.

Thereafter, the doped layer is etched. At this point a plurality of micromirrors are formed in positions opposite the set of electrodes. The torsion bar is formed coupling the micromirrors in one direction, bonded to the pillars at positions intermediate between two of the micromirrors adjacent in that direction.

During the patterning for this etching step, when the positional relationship with the set of electrodes already formed on the electrode substrate is considered, with the accuracy of a photolithography process, the micromirrors can be formed with high precision.

Using this method, the substrate positioning for bonding is easy, and moreover since the micromirrors and so forth can be fabricated after bonding, the method can be applied to high density layout of the micromirrors.

It should be noted that in the above method anode bonding can be adopted, or a frame portion can be formed on the silicon mirror substrate.

When the micromirrors are arranged in a high density layout, the electrode substrate may be formed of a transparent glass electrode substrate, and then the position of the pattern of the set of electrodes be observed from the side of the glass electrode substrate, and using this pattern position as a reference, the mask pattern alignment for the etching of the silicon electrode substrate carried out.

In the method inventions above, if the impurity concentration of the doped layer is at least $1\times10^{18}$ atm/cm$^3$, then during the etching of the silicon substrate the doped layer can be used to function as an etching stop layer.

The method of fabricating the glass electrode substrate may include the steps of:

masking positions corresponding to said rim and said pillars and etching a glass substrate including an alkalimetal to form said depression of a predetermined depth; and forming said sets of electrodes on the base of said depression. In this case the depth of the depressions which affects the deflection angle of the micromirrors, depends on the etching conditions.

The set of electrodes may be formed as a set of transparent electrodes of for example ITO (indium tin oxide), and before the bonding, there may be a step of inspecting the presence of foreign objects between the glass electrode substrate and the silicon mirror substrate from the side of the glass electrode substrate. If this inspection is carried out before the bonding, the yield is increased and when carried out after the bonding, the ingress of foreign objects which is a cause of defective products can be detected easily.

There may be an additional step of bonding a transparent cover plate on the silicon mirror substrate so as to cover the silicon mirror substrate and in a position non-interference with the micromirrors driven in an inclining manner.

By means of this transparent cover plate, the ingress of foreign objects which would impede the driving in an inclining manner of the micromirrors can be prevented, and the element protected.

The device of the present invention has a conductive silicon mirror substrate doped with impurities and an electrode substrate bonded integrally, wherein the silicon mirror substrate, comprises:

a plurality of micromirrors arranged in one of a line and matrix and having reflective layers formed on one surface; and a torsion bar coupling said micromirrors in one direction;

at least one said electrode substrate comprises:

a depression in a central region thereof;

a rim around the periphery thereof;

sets of electrodes formed within said depression in positions corresponding to said micromirrors and driving said micromirrors in an inclining manner by means of a coulomb force; and pillars projecting from said depression in positions corresponding to an interval between two of said micromirrors adjacent in said one direction; and wherein at least intermediate portions of said at least one torsion bar on said silicon mirror substrate are opposite said pillars of said electrode substrate, and said silicon mirror substrate and said electrode substrate are bonded. This bonding may be carried out by for example direct bonding or eutectic bonding.

The entire surface of the reflective layer formed on the micromirrors is formed as a flat surface. It can therefore reflect impinging light with an angle of reflection equal to the angle of incidence.

The set of electrodes is preferably formed as a set of transparent electrodes of for example ITO (indium tin oxide). By looking through the glass electrode substrate, the ingress of foreign objects between the set of electrodes and the micromirrors, which would result in a defective product, can easily be detected.

Where the micromirrors are opposite the set of electrodes an insulating film may be formed so that in when foreign objects ingress between the micromirrors and the set of electrodes, the serious problem of a short-circuit can be avoided.

The surface of the set of electrodes where the electrodes are opposite the insulating film formed on the micromirrors, may further be formed to be rough. The contact area between the insulating film and the set of electrodes is reduced, and the micromirrors sticking to the set of electrodes caused by static charge on the insulating film can be prevented.

The surface roughness is preferably provided by forming on the surface of the set of electrodes projections of height at least 200 Angstroms. In this way adequate roughness can be assured to prevent sticking between the micromirrors and the set of electrodes. It should be noted that if the gap between the micromirrors and the set of electrodes when the micromirrors and set of electrodes are parallel is G, then the upper limit to the height of these projections should be not more than G/3. This assures the minimum deflection angle of the micromirrors required for functional reasons.

To prevent sticking of the micromirrors, an insulating projection may be formed on the insulating film and at a position displaced from the torsion bar.

As another method of preventing sticking of the micromirrors, an insulating stopper may be formed. The insulating stopper projects from the base of the depression of the glass electrode substrate to a height less than the height of the rim and the pillars, and abuts the micromirrors when driven in an inclining manner, in order to determine the deflection angle.

Using the spatial light modulator of the present invention, various electronic devices can be constructed.

For example, a projector can be constructed from a projection lamp, a spatial light modulator which reflects light emitted by the projection lamp modulated for each pixel by driving in an inclining manner each of a plurality of micromirrors arranged one per pixel, and a projection lens which projects an enlarged image of the light reflected from the spatial light modulator on a screen.

An electronic photography apparatus can be constructed from a photosensitive drum on which a latent image is to be formed, a spatial light modulator which reflects light sequentially, and emits reflected light modulated while scanning in one direction toward the photosensitive drum to form a latent image by driving in an inclining manner each of a plurality of micromirrors arranged in an array, a developing device developing the latent image formed on the photosensitive drum, and a transfer device transferring the image on the photosensitive drum to a recording medium.

Further, an optical switching device can be constructed from a plurality of induction coils capable of generating desirable induction voltages, a spatial light modulator, and a wiring pattern connecting the induction coils and a set of electrodes of the spatial light modulator, a plurality of the micromirrors are each driven in an inclining manner, and a desirable optical signal is generated by light reflected from the micromirrors based on the induction voltages generated by each of the induction coils.

In an exposure device which irradiates an exposure target with light from a light source through an interposed mask to expose the exposure target, a spatial light modulator may be provided to reflect the light from the light source from individual micromirrors, thus irradiating the exposure target with modulated light.

In this way, it is possible to record ID information such as a lot number using an exposure process on an exposure target such as a semiconductor wafer.

Another aspect of the spatial light modulator of the present invention, comprising:

a glass substrate on which at least one conductive torsion bar coupling a plurality of conductive micromirrors in one direction is supported by pillars, and on which a conductive frame portion fixing both ends of said at least one torsion bar is formed; and a circuit substrate on which a plurality of pairs of electrodes opposite each of said micromirrors and a circuit element energizing said plurality of pairs of electrodes are formed;

and wherein said frame portion of said glass substrate and said circuit substrate are bonded.

In this way, the micromirrors and the circuit substrate can be fabricated separately, and foreign objects can also be inspected separately, as a result of which the yield can be increased. Moreover, the region in which the micromirrors are disposed is covered by the glass substrate, frame portion, and circuit substrate.

The micromirrors and torsion bar may be formed from silicon or a metal.

The method of fabricating the micromirrors of silicon, comprises:

(a) forming on a glass substrate a depression in a central region thereof, a rim surrounding said depression, and pillars formed to project from said depression;

(b) diffusing impurities into one surface of a silicon substrate to a predetermined depth;

(c) further diffusing impurities into a predetermined portion of said one surface of said silicon substrate to a predetermined depth to form an impurity diffusion surface;

(d) forming an optically reflective film on said impurity diffusion surface of said silicon substrate;

(e) bonding said impurity diffusion surface and said rim of said glass substrate, to form a silicon-glass bonded substrate;

(f) wet-etching said silicon-glass bonded substrate to make said silicon substrate into a thin film;

(g) dry-etching said silicon substrate of said thin film to form a plurality of micromirrors, a torsion bar coupling and supporting the same, and a frame portion fixing both ends of said torsion bar; and (h) bonding to said frame portion of said silicon-glass bonded substrate a silicon circuit substrate provided with a plurality of pairs of electrodes for driving said plurality of micromirrors, and circuit elements applying a drive voltage to said electrodes.

On the other hand, the method of fabricating the micromirrors of a metal, comprises:

(a) forming a first resist pattern on a glass substrate to form pillars in a central region thereof and a first rim on the periphery thereof;

(b) forming a first metal film on said glass substrate and said first resist pattern;

(c) forming on said first metal film a second resist pattern to form micromirrors and a torsion bar;

(d) etching said first metal film using said second resist pattern;

(e) removing said second resist pattern;

(f) forming a third resist pattern in a region excluding a surface of said first rim;

(g) forming a second metal film on said first rim and said third resist pattern;

(h) forming a fourth resist pattern on said second metal film and in position opposite said first rim;

(i) etching said second metal film using said fourth resist pattern, and extending said first rim to form a second rim;

(j) removing said first, third, and fourth resist patterns; and (k) bonding a silicon circuit substrate provided with circuit elements for driving said micromirrors and said second rim of said glass substrate.

In either of the methods, the circuit substrate and the glass substrate may be subjected to diffusion bonding or bonded using a conductive adhesive.

BRIEF DESCRIPTION OF THE DRAWINGS

FIGS. 4A, 4B, 4C, 4D, 4E, 4F, 4G, 4H, and 4I are each schematic sectional drawings illustrating fabrication steps of a silicon mirror substrate of the spatial light modulator shown in FIG. 1.

FIGS. 25A, 25B, 25C, 25D, 25E, and 25F are each schematic drawings illustrating steps of forming an upper layer on the intermediate layer obtained from the process shown in FIG. 24.

FIGS. 29A, 29B, 29C, 29D, 29E, 29F, 29G, 29H, 29I, and 29J are each schematic drawings illustrating fabrication steps of a ninth embodiment of the spatial light modulator according to the present invention.

PREFERRED EMBODIMENTS OF THE INVENTION

The present spatial light modulator provided with a micromirror and the method of manufacturing the same are now described in terms of a number of preferred embodiments, with reference to the drawings.

First Embodiment

Structural Description of the Spatial Light Modulator

Figure 1:
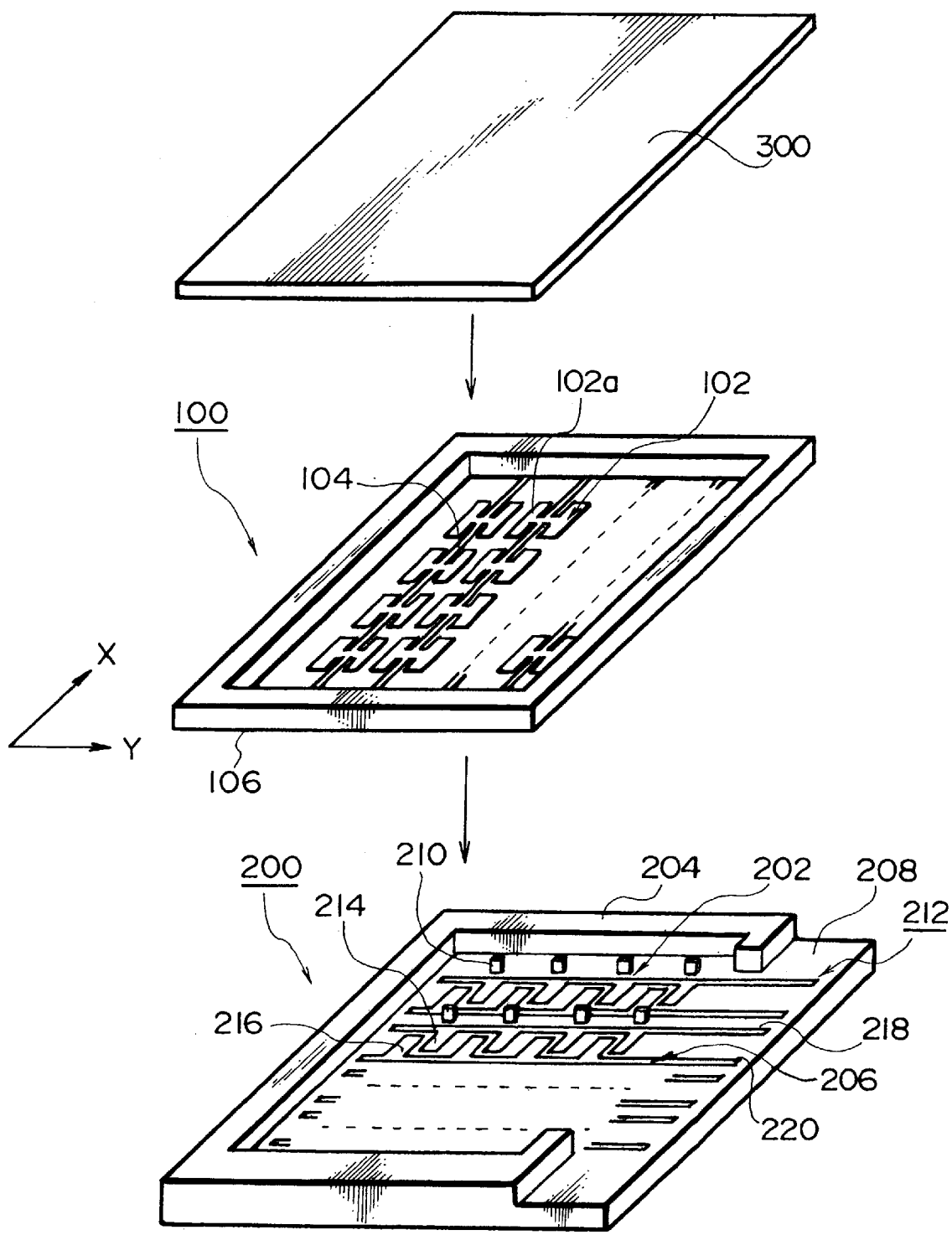
FIG. 1 is a perspective exploded assembly view of a spatial light modulator of a first embodiment according to the present invention.

FIG. 1 is a perspective exploded assembly view showing principal elements of a spatial light modulator of a first embodiment. In this figure, the spatial light modulator is basically constructed of a silicon mirror substrate 100, a glass electrode substrate 200, and a cover glass 300.

The silicon mirror substrate 100 has a plurality of micromirrors 102 arranged in a matrix. Of these micromirrors 102, a plurality arranged in a particular direction, for example the x-direction in the figure are coupled by a torsion bar 104. Furthermore, surrounding the area in which the plurality of micromirrors 102 is arranged, a frame portion 106 is provided. This frame portion 106 is coupled to both ends of each of the torsion bars 104.

Figure 2:
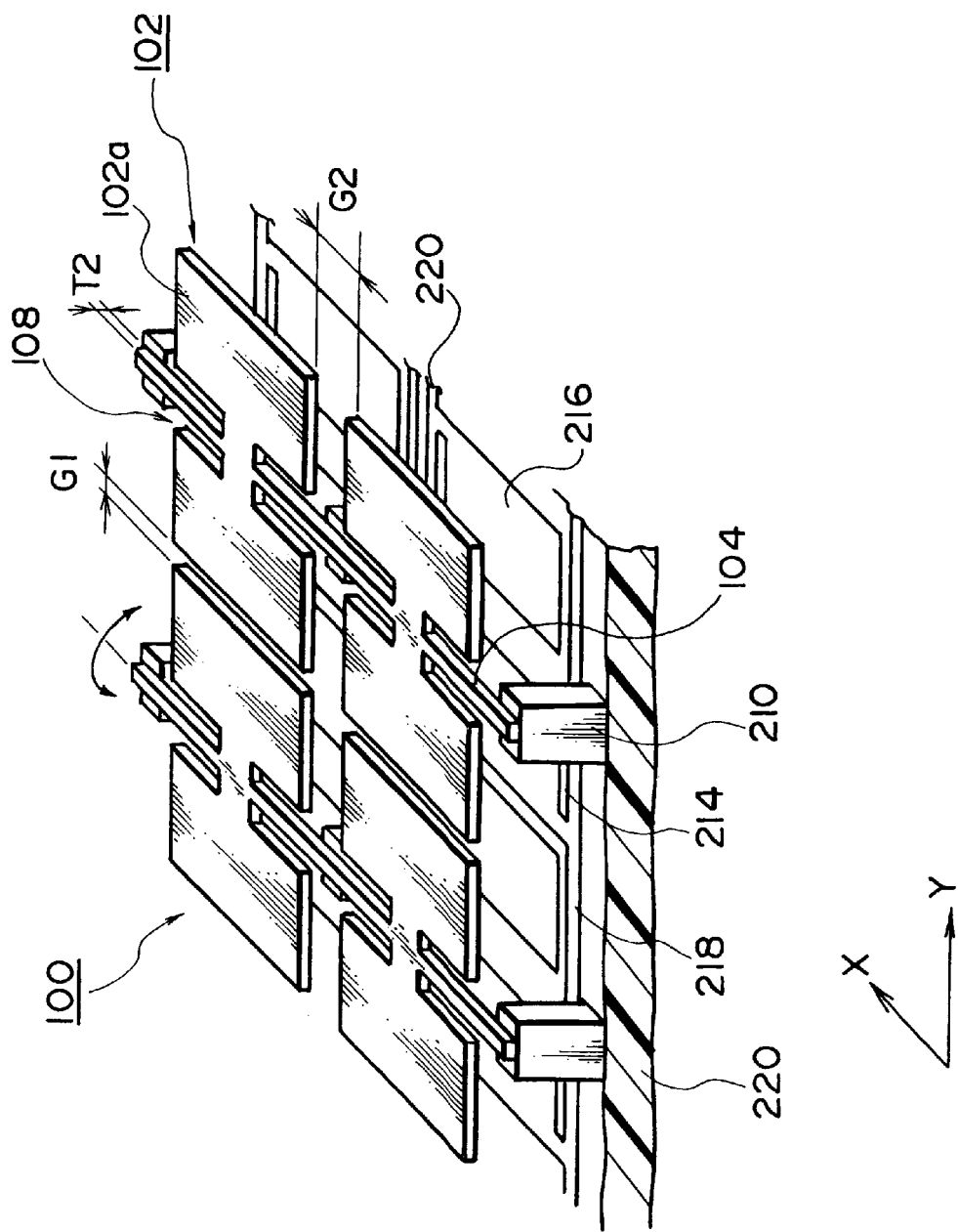
FIG. 2 is an enlarged perspective view of a micromirror used in the device shown in FIG. 1.

As shown in the enlargement in FIG. 2, these micromirrors 102 have slits 108 formed in the periphery of the linkage portion with the torsion bars 104. By the formation of these slits 108, the micromirrors 102 can be easily driven in an inclining manner in the direction shown by an arrow in FIG. 2. Furthermore, the surface of the micromirrors 102 has formed on it a reflecting layer 102a. Thus, the micromirrors 102 can be driven in an inclining manner by means of the driving operation described below, whereby the reflected direction of light impinging on the micromirrors 102 can be changed. Additionally, by controlling the time for which the light is reflected in a particular direction, the light can be modulated.

Figure 3A:
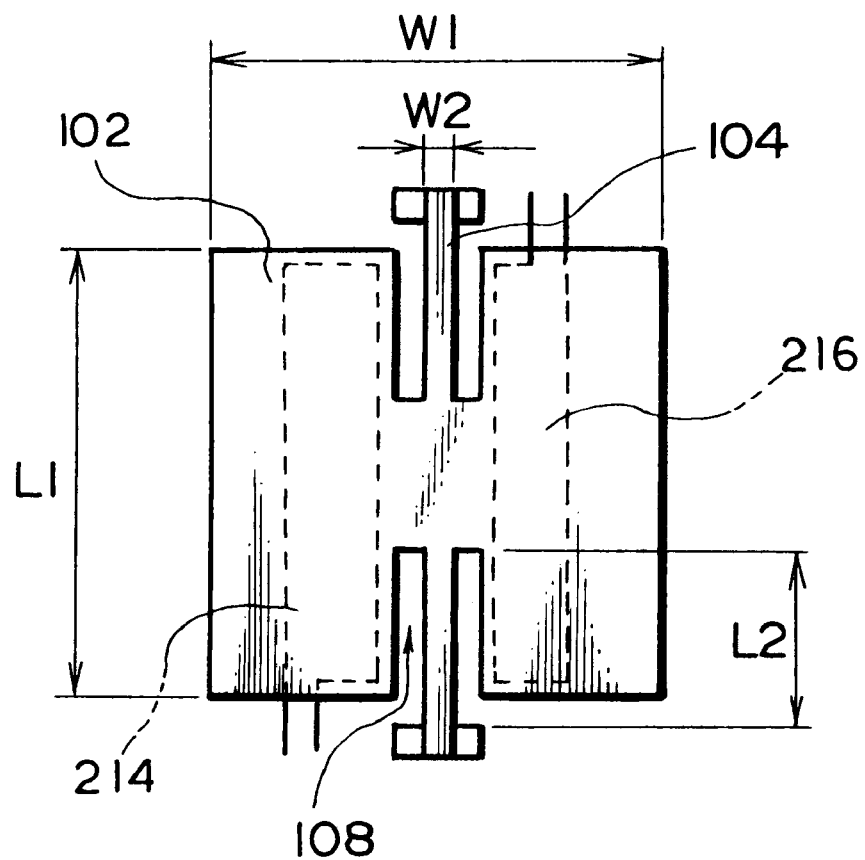
FIG. 3A is a plan view of a micromirror.
Figure 3B:
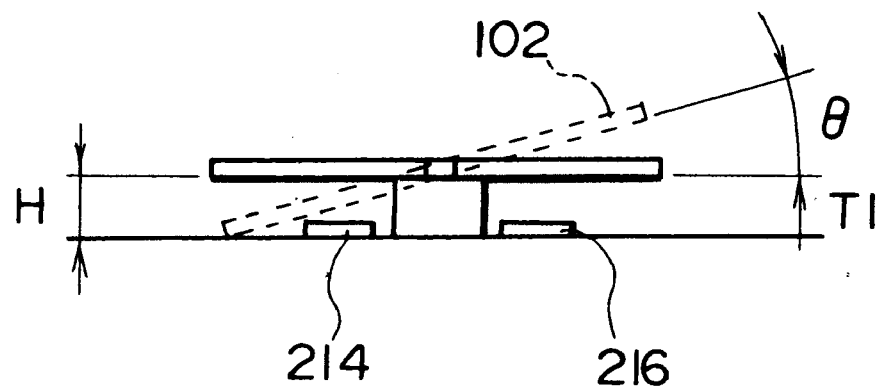
FIG. 3B is a side elevation of a micromirror.

The dimensions of the micromirrors 102 and torsion bars 104 shown in FIGS. 2, 3A, and 3B are as follows.

|  |  | Minimum value | Maximum value |
|---|---|---|---|
| Mirror width | W1 | 10 μm | 100 μm |
| Mirror length | L1 | 10 μm | 100 μm |
| Mirror thickness | T1 | 0.5 μm | 5 μm |
| Torsion bar width | W2 | 1 μm | 5 μm |
| Torsion bar thickness | T2 | 0.5 μm | 5 μm |
| Torsion bar length | L2 | 5 μm | 20 μm |
| Cavity depth | H | 0.5 μm | 20 μm |
| Inclination angle | θ | ±5° | ±20° |

The glass electrode substrate 200 shown in FIG. 1 has a depression 202 in the central region, and a rim portion 204 around the periphery thereof. One side of the rim portion 204 is cut away to form an electrode removing opening 206, and on the outside of this electrode removing opening 206 is formed an electrode removing strip 208 continuous with the depression 202.

In the depression 202 of the glass electrode substrate 200, a plurality of pillars 210 projecting upward from the depression 202 and having the same height as the rim portion 204 are formed opposite to the torsion bars 104 located between two micromirrors 102 adjacent in the x-direction.

Furthermore, on the depression 202 and the electrode removing strip 208, a wiring pattern 212 is formed. This wiring pattern 212, as shown in FIG. 2, includes first and second address electrodes 214 and 216 disposed opposite to the rear surfaces of the micromirrors 102 which sandwich the torsion bar 104. Moreover, the first address electrodes 214 extending in the y-direction are connected in common with first common wiring lines 218. Similarly, the second address electrodes 216 extending in the y-direction are connected in common with second common wiring lines 220.

On the glass electrode substrate 200 with the above construction, as shown in FIG. 1, a silicon mirror substrate 100 is anode-bonded. At this point, the end portions of the torsion bars 104 and the frame portion 106 on the silicon mirror substrate 100 are bonded with the rim portion 204 of the glass electrode substrate 200. Furthermore, intermediate portions of the torsion bars 104 of the silicon mirror substrate 100 and the pillars 210 of the glass electrode substrate 200 are anode-bonded. Thereafter, the cover glass 300 is bonded on the frame portion 106 of the silicon mirror substrate 100. The end portions of the torsion bars 104 coupled to the frame portion 106 are subjected to dicing at the position of being cut away from the frame portion 106. Then the edge portion including the rim portion 204 of the glass electrode substrate 200 cut away to form the electrode removing opening 206 is hermetically sealed with a sealing material to complete the first embodiment of the spatial light modulator. By further evacuating the interior of the spatial light modulator by any of various methods, the resistance of the micromirrors when driven is reduced, yielding a faster response and a reduced power consumption.

Operating Principles of Spatial Light Modulator

When a micromirror 102 is driven to the "ON" orientation, simultaneously a plurality of the micromirrors 102 aligned in the x-direction as shown in FIG. 1 will be electrically energized through the torsion bar 104. On the other hand, at the same time, the first and second address electrodes 214 and 216 as a combination are driven either in point sequence or in line sequence, and by selecting the torsion bar 104 to be energized in sequence in the y-direction of FIG. 1, the micromirrors 102 arranged in a matrix can be driven to the "ON" orientation in a predetermined cycle.

On the other hand, to drive the micromirrors 102 to the "OFF" orientation, the polarity of the voltage applied to the first and second address electrodes 214 and 216 is made the reverse of that applied for driving to the "ON" orientation. In this way, the micromirrors 102 are driven in an inclining manner in the direction opposite to that for driving to the "ON" orientation.

Fabrication Process of Spatial Light Modulator

The fabrication process of the spatial light modulator of the first embodiment is described with reference to FIGS. 4 and 5. First the fabrication process of the silicon mirror substrate 100 is described.

I. Fabrication Process of the Silicon Mirror Substrate 100

(1) Formation of silicon substrate having doped layer

In this step, on one surface of a silicon substrate 110, shown in FIG. 4A, a doped layer 112, shown in FIG. 4B, is formed. For this purpose a layer of for example a boron dopant is formed on the silicon substrate 110 by spin coating. As this boron dopant may be used $B_2O_3$ mixed with an organic solvent, such as the material PBF supplied by Tokyo Oka Company. At this stage the thickness of the film of boron dopant may be adjusted by its dependence on the spin rotation conditions of the silicon substrate 110 and the viscosity of the boron dopant.

In this embodiment, if the boron dopant has a viscosity of from 50 to 100 cp, by adjusting the spin rotation conditions, the thickness of the film of boron dopant can be varied in the range 0.5 to 5.0 μm.

After spin coating with the boron dopant, heat may be applied in a furnace at 100 to 180° C. for 20 to 40 minutes, and the solvent of the boron dopant evaporated. In this embodiment, baking was carried out for 30 minutes at 140° C. Further, by firing in an oxygen atmosphere for 1 to 2 hours at 400 to 800° C., the binder can be removed. In this embodiment, firing was carried out for 1 hour at 600° C. In the subsequent step of thermal diffusion, thermal diffusion may be carried out for 4 to 10 hours at 800 to 1200° C. in a nitrogen atmosphere. In this embodiment, thermal diffusion was carried out for 6 hours at 1100° C.

As a result, the boron (B) of the boron dopant was thermally diffused into the silicon substrate 110, and on the lower surface of the silicon substrate 110 the boron doped layer 112 shown in FIG. 4B was formed. The thickness of the boron doped layer 112 can be adjusted in this thermal diffusion step by varying the time and temperature conditions, and in this embodiment, by carrying out thermal diffusion for 6 hours at 1000° C. a boron doped layer 112 of thickness 2 to 3 μm was formed.

In this case, the boron concentration in the boron doped layer 112 is preferably at least $1 \times 10^{18}$ atm/cm$^3$. In this way, in the step of etching the silicon substrate 110 described below, the boron doped layer 112 can be made to function as an etching stop layer.

To form the boron doped layer, it is also possible to use the boron diffusion plate method. In this case, the surface of the silicon substrate which is to be boron-doped is disposed in opposition to for example a "Boron-purasu-ban" [plate] (trade name) produced by Tekune Gurasu (Glass) Company. The spacing between these two should be 0.5 to 4.0 mm, and preferably from 2.0 to 3.0 mm. With this spacing maintained, a thermal diffusion process is carried out in a thermal furnace at from 800 to 1200° C., and for example at 1100° C., with a nitrogen flow rate of 3 to 8 liters/minute, and for example 6 liters/minute, for from 1 to 6 hours, and for example for 2 hours.

As a further method, the ion implantation method can be used. In this case the acceleration energy is from 20 to 50 keV, and an optimum value is 35 keV. The dose value which represents the number of accelerated electrons is appropriately from $2\times10^{18}$ to $8\times10^{18}$, and preferably $4\times10^{[/18/]}$. The beam current is appropriately from 1.5 to 4.6 mA and preferably 3.0 mA. Carrying out ion implantation under these conditions resulted in a boron doped layer of between 0.5 and 4 μm.

(2) Thermal oxidation step

The silicon substrate 110 with the boron doped layer 112 formed thereon 16 inserted in a thermal oxidation furnace, and as shown in FIG. 4C a thermal oxidation film 114 is formed around the silicon substrate 110. In this embodiment, the thermal oxidation processing is carried out by the wet oxidation method at a temperature of 1000° C. for 4 hours, and a thermal oxidation film 114 of thickness 1 μm is formed. At this time the boron doped layer 112 is also thermally oxidized, and the thermal oxidation film 114 formed also on the surface thereof.

(3) Patterning step

The silicon substrate 110 with the thermal oxidation film 114 is subjected to a photolithography process, and thus patterned as shown in FIG. 4D. As shown in this figure, on the front surface of the silicon substrate 110, a first mask 116 is patterned to form a window in the central region. On the underside of the silicon substrate 110 having the boron doped layer 112, a second mask 118 is patterned to form the micromirrors 102, torsion bars 104, frame portion 106, slits 108, and possibly other elements shown in FIGS. 1 to 3. For this patterning, the front surface and rear surface of the thermal oxidation film 114 are each painted with resist, exposed, and developed. After the development stage, a buffered hydrofluoric acid solution is used to remove a predetermined portion of the thermal oxidation film (silicon oxide film) 114. Thereafter, resist removal is carried out to complete the patterning step. This resist removal can be carried out for example by a mixture of sulfuric acid and aqueous hydrogen peroxide heated to 80° C.

(4) Step of etching silicon substrate 110

As shown in FIG. 4E, using the first mask 116 formed on the upper surface of the silicon substrate 110, the silicon substrate 110 is etched away. This etching step is carried out by wet etching of the silicon substrate 110 with an aqueous solution of KOH of concentration from 1 to 40% by weight. For the concentration of the aqueous solution of KOH, a figure of approximately 10% by weight is ideal. The reaction in this etching step is shown by the following expression:

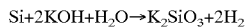

$$Si + 2KOH + H_2O \rightarrow K_2SiO_3 + 2H_2$$

Here, as shown in FIG. 4E, if the crystal orientation of the surface 110a of the silicon substrate 110 is (100), then the side walls 110b formed by the etching process will be inclined at an angle of 55 degrees. On the other hand, if the crystal orientation of the surface 110a is (110), then substantially perpendicular side walls 110b can be obtained, and etching of high anisotropy realized. In this way, a larger surface area is made possible for the spatial light modulation.

In this case, the detection of etching completion can be achieved by observing hydrogen bubbles generated by the reaction with the silicon substrate 110, and determining the point when bubbles stop being generated as the completion point. Alternatively, by making the impurity concentration of the boron doped layer 112 more than $1\times10^{18}$ atm/cm$^3$, the boron doped layer 112 can be used to function as an etching stop layer.

It should be noted that the etching fluid used in this step may be for example an aqueous solution of TMAH (tetraethyl ammonium hydroxide), an aqueous solution of ethylenediamine-pyrocatechol-diazine (EPD), or an aqueous solution of hydrazine as an alternative to an aqueous solution of KOH.

(5) Etching of boron doped layer 112

As shown in FIG. 4F, using the second mask 118 formed on the thermal oxidation film 114 on the underside, the boron doped layer 112 is dry-etched.

This dry etching is preferably carried by the RIE (reactive ion etching) process, which has a fast etching rate and is adapted to volume production. Here the processing gases used are $CF_4$ introduced at 30 to 60 sccm and $O_2$ at 30 to 60 sccm, with a 13.56 MHz high frequency supply of a power of 400 to 800 W, in particular as an optimum value set to 600 W. The pressure within the chamber is preferably between 0.05 and 0.30 Torr, and in this embodiment the optimum value of 0.15 Torr is adopted. In this embodiment, for etching a 2 μm boron doped layer, an etching time of 15 to 30 minutes is required.

By dry-etching the boron doped layer 112, the micromirrors 102, torsion bars 104, frame portion 106, and slits 108, shown in FIGS. 1 to 3 are formed.

(6) Step of removing thermal oxidation film 114

After the thermal oxidation film 114 has served as a masking material for the etching in step (5), the film 114 is removed. As a removal method may be used for example a buffered hydrofluoric acid solution, as described in the patterning step (3). Alternatively, a dilute solution of about 10% hydrofluoric acid may be used. In this embodiment of this step, as shown in FIG. 4G, the result is that the micromirrors 102, torsion bars 104, and other elements are supported by the frame portion 106 formed on the boron doped layer 112.

(7) Vapor deposition of reflecting layer 102a

On the surface of the micromirrors 102 formed on the boron doped layer 112, a reflecting layer 102a of for example aluminum (Al) is formed by vapor deposition with a thickness of for example 0.2 to 2 μm. If the thickness of the reflecting layer 102a exceeds the upper limit, the inertial moment of the micromirrors 102 is increased. As a result, the response speed when driven is lowered, and the drive voltage for driven in an inclining manner is increased. When the film thickness is below the lower limit, it is difficult to form a reflecting layer 102a of uniform thickness to cover the whole boron doped layer 112.

At this time, the surface portions other than the micromirrors 102, in other words the torsion bars 104, may be masked to prevent the adhesion of aluminum, but in this embodiment a reflecting layer 102a may equally be formed on the torsion bars 104. The top surface of the silicon substrate 110 remaining on the surface of the frame portion 106 will hereafter be a region subject to anode bonding with the glass electrode substrate 200, and it is important that the region is masked to prevent the adhesion of foreign objects which would impede the anode bonding of this portion.

It should be noted that the material of the reflecting layer 102a may be any material that reflects visible light with high efficiency, and for example silver (Ag) may be used. The step of forming the reflecting layer 102a is not restricted to a process of vapor deposition, and for example sputtering may equally be used.

In the step of forming the reflecting layer 102a, since the boron doped layer 112 which forms the base is flat, the reflecting layer 102a can also be formed thereon to be flat. In this way, light impinging on the reflecting layer 102a can be reflected with an angle of reflection equal to the angle of incidence. Furthermore, when the spatial light modulator is used in the construction of a display device, the contrast can be increased.

By the implementation of the above steps, the silicon mirror substrate 100 shown in FIGS. 1 to 3 is completed. After this, as shown in FIG. 4I, the silicon mirror substrate 100, glass electrode substrate 200, and cover glass 300 are bonded. Before describing this bonding step, the process of fabricating the glass electrode substrate 200 is described with reference to FIG. 5.

II. Fabrication Process of Glass Electrode Substrate 200

Figure 5A:
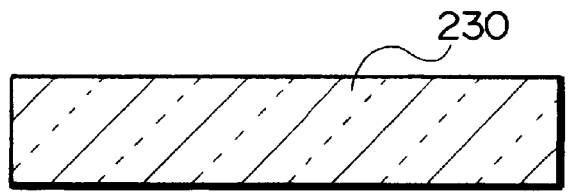
FIGS. 5A, 5B, 5C, 5D, 5E, 5F, and 5G are each schematic sectional drawings illustrating fabrication steps of a glass electrode substrate of the spatial light modulator shown in FIG. 1.

As shown in FIG. 5A, a glass substrate 230 forming the base to the glass electrode substrate 200 employs a glass substrate containing an alkali metal such as sodium (Na) for the purposes of the anode bonding process described below. As this type of glass substrate 230 may be used for example sodium borosilicate glass such as Pyrex (trade name) from the Corning Company. In particular, in consideration of making the coefficient of thermal expansion equal to that of silicon, since the glass substrate 230 should be heated in the anode bonding process, Corning #7740 (trade name) is optimum.

The fabrication process of the glass electrode substrate 200 using this glass substrate 230 is now described.

(1) Patterning step for depression 202 and other elements

Figure 5B:
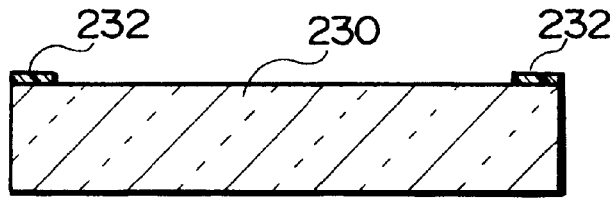

By painting a resist on the glass substrate 230 and carrying out exposure and development on the surface of the glass substrate 230 as shown in FIG. 5B, a resist pattern portion 232 is formed. The resist pattern portion 232 is formed in the positions corresponding to the rim portion 204 and the pillars 210.

(2) Etching to form the depression 202 and other elements

With the resist pattern portion 232 as a mask, wet etching of the glass substrate 230 is carried out with a hydrofluoric acid solution. In this way, in addition to the depression 202 shown in FIG. 5C, the electrode removing opening 206 and electrode removing strip 208 are also simultaneously formed. The depth of the depression 202 can be adjusted by varying the etching conditions, such as the etching time and the temperature.

The depth of the depression 202 is an important element in determining the deflection angle of the micromirrors 102, and it is necessary to adjust the etching conditions as above so as to form the depression 202 with a constant depth from lot to lot.

(3) Step of resist removal

Figure 5C:
Figure 5D:
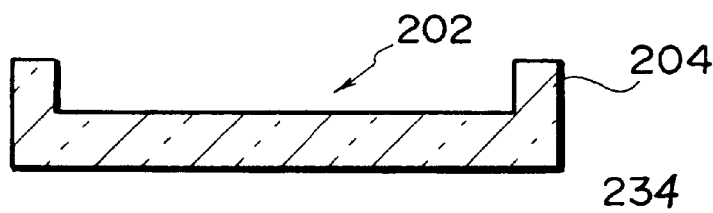
Figure 5E:

This resist removal can be carried out using a mixture of sulfuric acid and aqueous hydrogen peroxide, and thereby as shown in FIG. 5D, the resist pattern portion 232 can be removed from the top surface of the rim portion 204 formed on the glass substrate 230.

(4) Step of forming wiring pattern 212

Figure 5F:
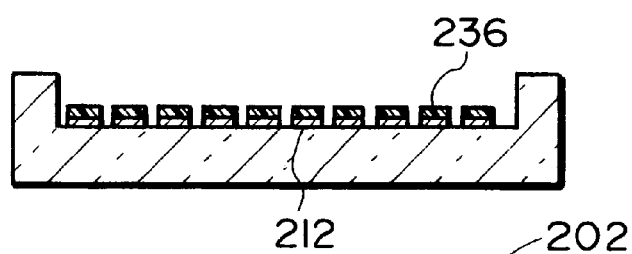

In order to form the wiring pattern 212 on the depression 202 and electrode removing strip 208, first, as shown in FIG. 5F, over the whole surface of the glass substrate 230 is formed an electrode film 234 of a metal such as aluminum (Al), silver (Ag), and gold (Au), or a transparent electrode material such as ITO. This electrode film 234 may be formed by vapor deposition, sputtering, or ion plating. Thereafter, by carrying out a photolithography process on the electrode film 234, a resist pattern portion 236 is formed (see FIG. 5F). Next, using the resist pattern portion 236 as a mask, the electrode film 234 is etched. This etching can be carried out by wet etching.

Figure 5G:
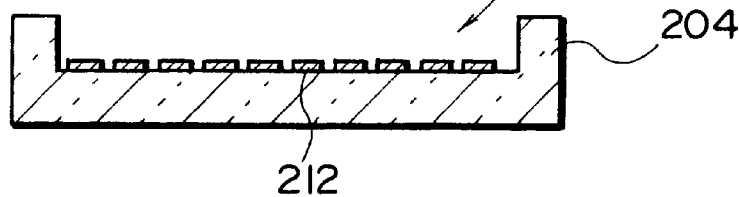

Then as shown in FIG. 5G, by removing the resist pattern portion 236 on the wiring pattern 212, the glass electrode substrate 200 is completed. The material used for removal should be selected appropriately depending on the material of the electrode film 234. The material of the electrode film 234 may be ITO. In this case, a mixture of sulfuric acid and aqueous hydrogen peroxide cannot be used as removal agent, as it would dissolve the ITO. In place of the mixture a removal agent based on an organic solvent can be used.

III. Anode Bonding of Silicon Mirror Substrate 100 and Glass Electrode Substrate 200

Figure 6:
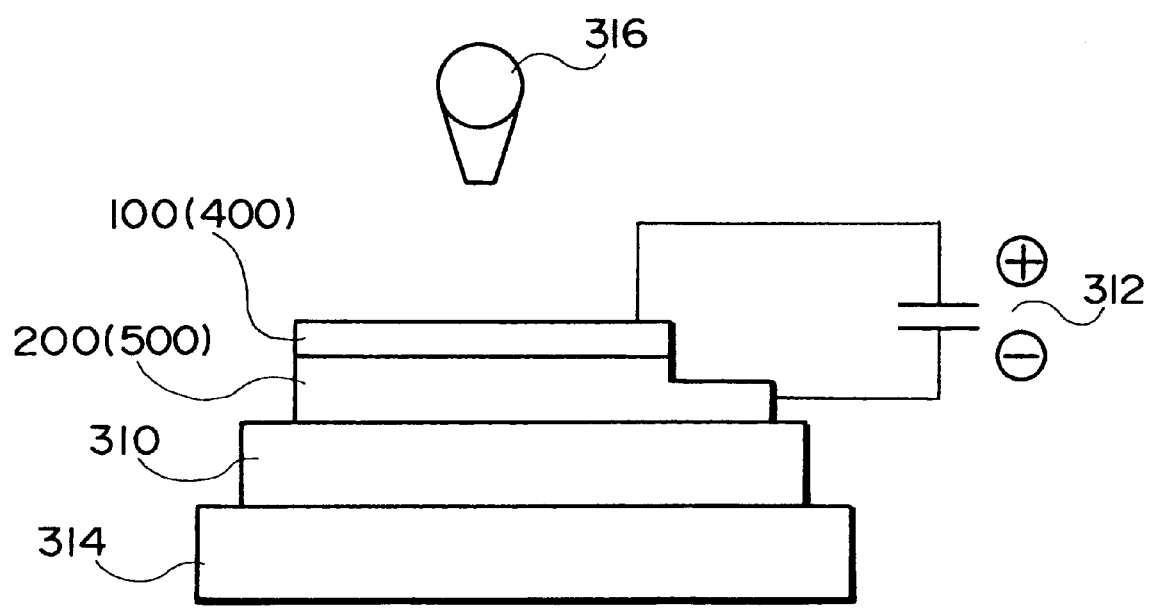
FIG. 6 is a schematic drawing illustrating the anode bonding process of FIG. 4I.

As shown in FIG. 6, the glass electrode substrate 200 is mounted on a hot plate 310 mounted on a positioning mechanism 314, and the silicon mirror substrate 100 is placed thereon. At this time, the first and second address electrodes 214 and 216 formed on the glass electrode substrate 200 and the micromirrors 102 formed on the silicon mirror substrate 100 are positioned to face each other. This positioning is carried out by observing from above with a microscope 316, while moving the glass electrode substrate 200 two-dimensionally by means of the positioning mechanism 314.

In the anode bonding process, if dirt or other foreign objects get in between the substrates 100 and 200, a short-circuit will occur between the micromirrors 102 and the wiring pattern 212, and the product will be defective. It is very important to carry out an inspection the presence or absence of foreign objects before bonding the two substrates 100 and 200. This inspection can be made before aligning the substrates 100 and 200, or equally after the substrates are aligned if the wiring pattern 212 is formed of a transparent electrode material such as ITO, by observation with a microscope from below the glass electrode substrate 200.

The silicon mirror substrate 100 and glass electrode substrate 200 are connected to a DC power supply 312. The silicon mirror substrate 100 is connected to the positive terminal of the DC power supply 312, and the glass electrode substrate 200 is connected to the negative terminal of the DC power supply 312. Then by means of the hot plate 310 the glass electrode substrate 200 is heated to between 250 and 450° C., and for example to 350° C., and 300 to 1000 V, for example 600 V, is applied from the DC power supply 312 for 2 to 3 minutes.

In this way, by means of the heating by the hot plate 310, the Na+ ions in the glass electrode substrate 200 become more motile. The motility of the Na+ ions imparts a negative charge to the bonding surface of the glass electrode substrate 200, and a positive charge to the bonding surface of the silicon mirror substrate 100. As a result, a large Coulomb force is generated between the two bonding surfaces, and at the interface chemical bonding occurs, whereby the electrostatic bonding is carried out. In this way, the silicon mirror substrate 100 and glass electrode substrate 200 can be strongly bonded.

By means of this anode bonding, both ends of the torsion bars 104 and the frame portion 106 of the silicon mirror substrate 100 are bonded to the rim portion 204 of the glass electrode substrate 200. Thus, the intermediate portions of the torsion bars 104 of the silicon mirror substrate 100 are bonded to the pillars 210 of the glass electrode substrate 200.

In this way, by the anode bonding of the silicon mirror substrate 100 and the glass electrode substrate 200, a positive bond between the two is obtained, without the thickness of an adhesive film which follows from the use of an adhesive. Moreover, in contradistinction to the case in which an adhesive is used, there is none of the fluctuation in thickness of the adhesive film, and therefore the depth H of the depression shown in FIG. 3B can be made substantially constant from lot to lot. This depth H of the depression determines the deflection angle θ of the micromirrors 102, but by means of anode bonding the deflection angle θ can also be made substantially constant from lot to lot.

If the cover glass 300 is like the glass electrode substrate 200 made of a glass substrate containing sodium, then the cover glass 300 can similarly be anode-bonded to the frame portion 106 of the silicon mirror substrate 100. However, the bonding of the silicon mirror substrate 100 and cover glass 300 does not require high precision, and therefore other methods, such as an adhesive, may equally be used.

IV. Sealing, Dicing, and Wiring Processes (1) Sealing process

The electrode connecting opening 206 is hermetically sealed with a sealing material. By doing this, in the dicing step (2) the ingress of foreign objects, water, or anything else to the space between the silicon mirror substrate 100 and glass electrode substrate 200 is prevented. As a result, short-circuits occurring between the micromirrors 102 and the wiring pattern 212 are prevented, and the yield of the process can be increased. Furthermore, in the dicing step (2), in the two side walls of a spatial light modulator element 330, as shown in FIG. 7B, a very small gap 240 occurs with the sheet thickness of the torsion bars 104, and therefore this very small gap 240 can similarly also be sealed.

(2) Dicing process

Figure 7A:
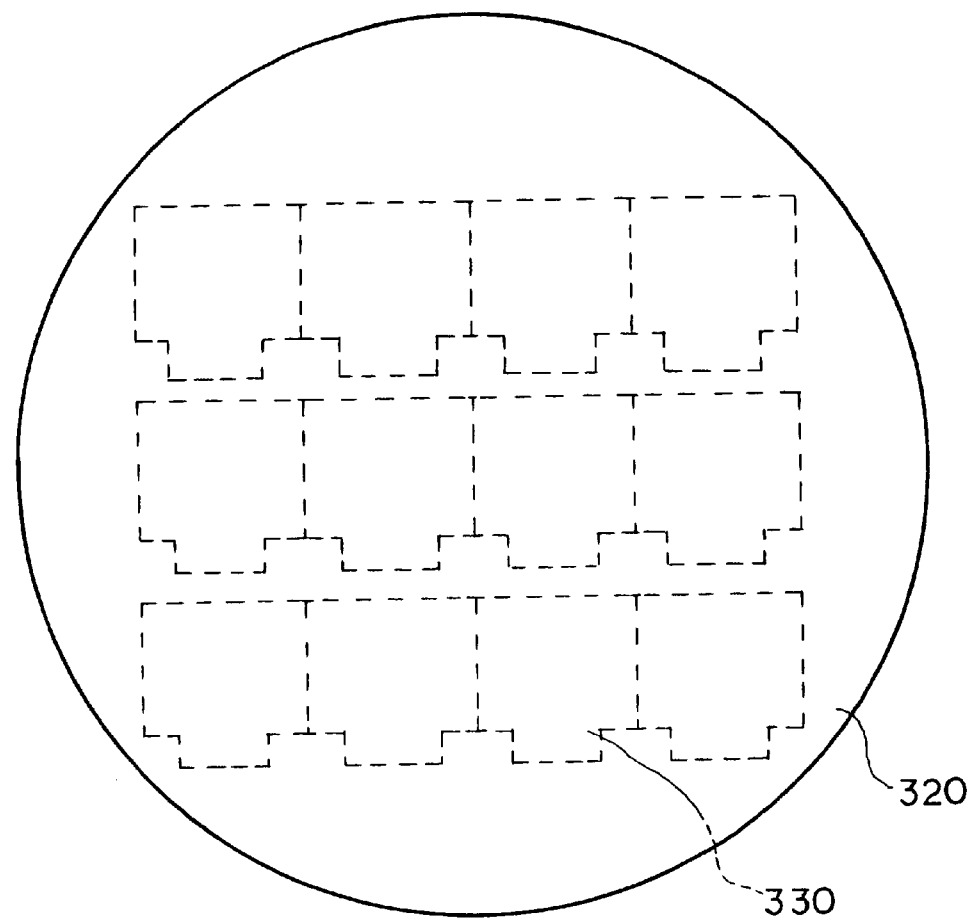
FIG. 7A is a schematic drawing illustrating the spatial light modulators shown in FIG. 1 being fabricated on a single wafer.
Figure 7B:
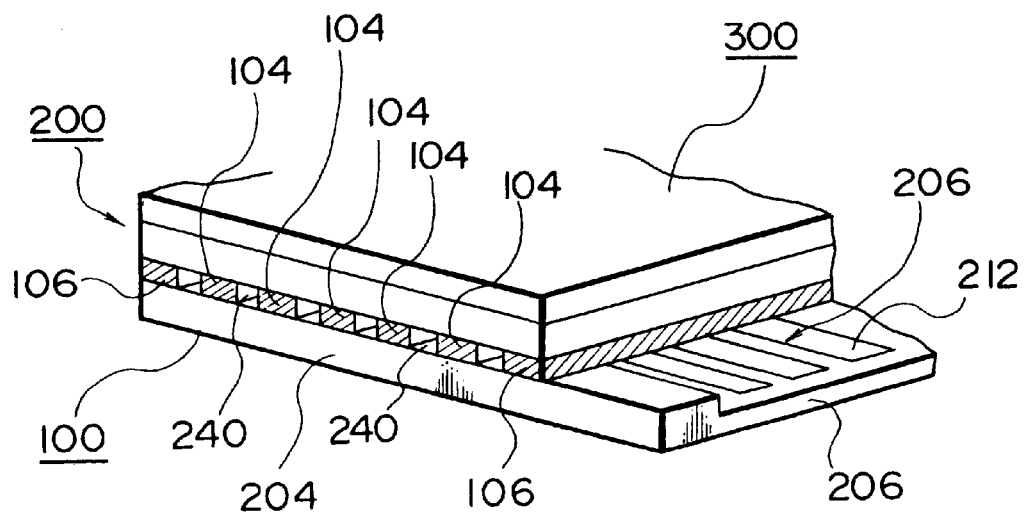
FIG. 7B is a schematic perspective view of a single spatial light modulator separated from the wafer.

As shown in FIG. 7A, a plurality of the spatial light modulator elements 330 obtained as described above are fabricated simultaneously on a single wafer 320 constituting the silicon substrate 110 shown in FIG. 4A. Therefore, after the spatial light modulator element 330 is completed, the wafer 320 is diced to separate it into individual spatial light modulator elements 330. By means of this dicing step, both ends of the torsion bars 104 coupled to the frame portion 106 are cut away, and thus function as independent electrodes separated in the y-direction in FIG. 1. A spatial light modulator element 330 separated by the dicing step is as shown in FIG. 7B.

(3) Wiring process

The separated spatial light modulator element 330 is fixed to a substrate not shown in the drawings, and wiring carried out. As shown in FIG. 7B, the wiring process is carried out by connecting the wiring pattern 212 on the electrode connecting strip 208 and the ends of the torsion bars 104 exposed in the side walls to a drive circuit not shown in the drawings. In this way, the spatial light modulator is completed.

Second Embodiment

Figure 8:
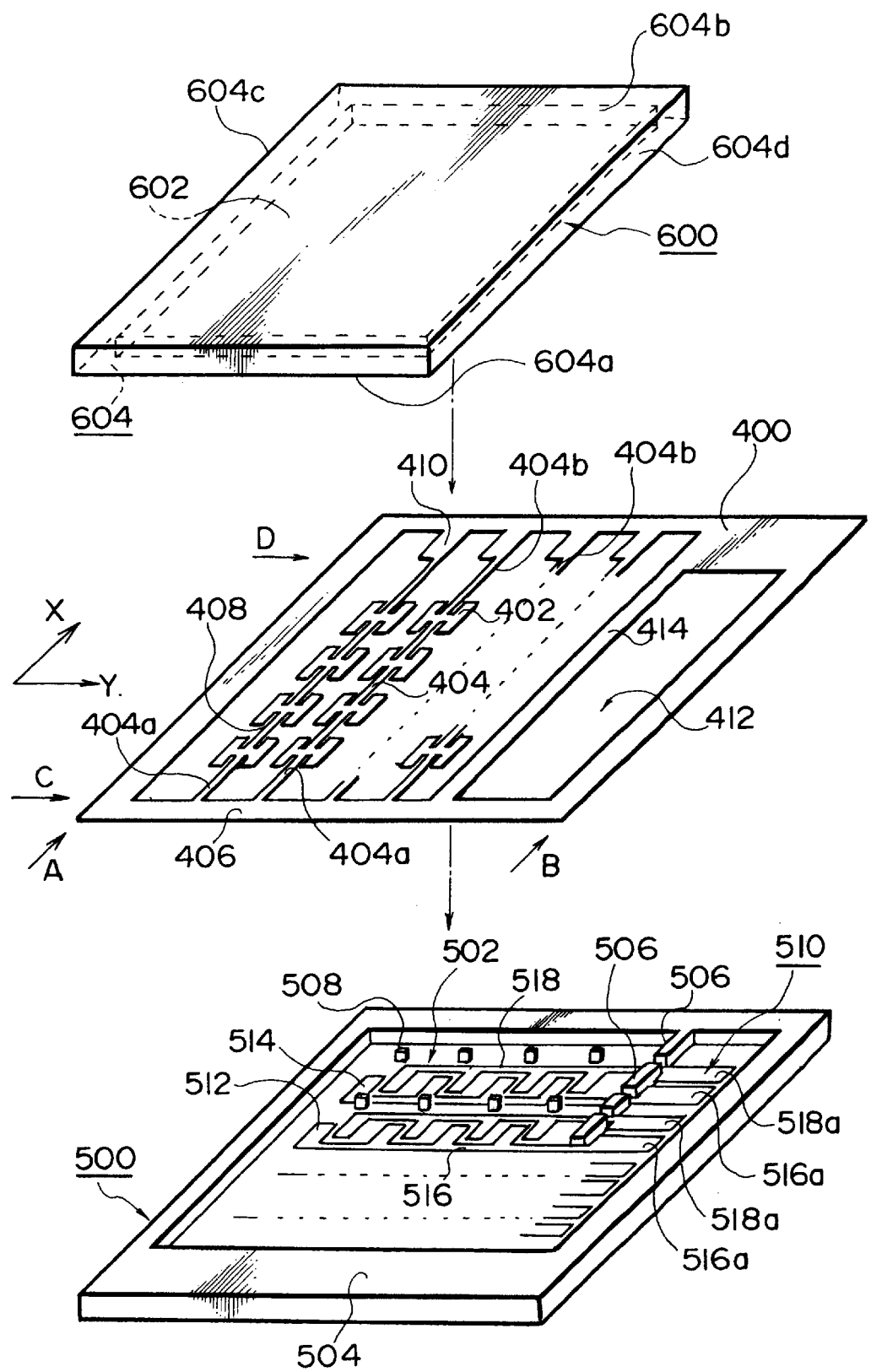
FIG. 8 is a perspective exploded assembly view of a spatial light modulator of a second embodiment according to the present invention.
Figure 9:
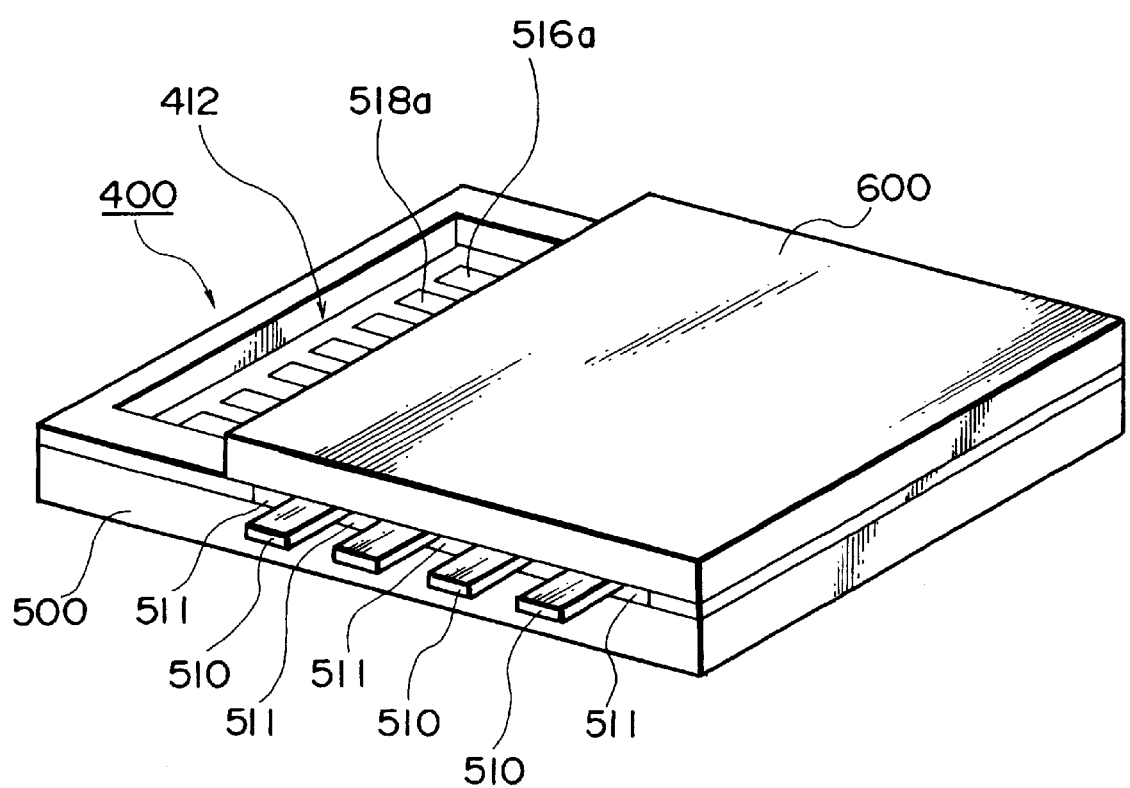
FIG. 9 is a perspective view of the spatial light modulator of the second embodiment.

A spatial light modulator capable of high density mounting is described with reference to FIGS. 8 to 10. Overall construction of high density mounting spatial light modulator The spatial light modulator of the second embodiment, as shown in FIGS. 8 and 9, is basically constructed of a silicon mirror substrate 400, a glass electrode substrate 500, and a cover glass 600. The silicon mirror substrate 400 and glass electrode substrate 500 are anode bonded in the same way as in the first embodiment. The positional relationship of the silicon mirror substrate 400 and the cover glass 600 has no effect on the deflection angle of the micromirrors, and as in the first embodiment, in place of anode bonding of the substrates 400 and 600, other bonding methods such as an adhesive may be used.

The silicon mirror substrate 400 has a plurality of micromirrors 402 arranged in a matrix in the x- and y-directions as shown in FIG. 8, torsion bars 404 coupling a plurality of the micromirrors 402 arranged in the x-direction, and a frame portion 406 coupling the ends of the torsion bars 404. In the periphery of the linkage portion of the micromirrors 402 with the torsion bars 404 are formed slits 408. At one end 404a each of the torsion bars 404 is directly coupled to the frame portion 406, while at the other end 404b it is coupled to the frame portion 406 through a mirror electrode 410 of large area.

One side of the frame portion 406 has formed therein an address electrode removing opening 412. Further, a divider 414 is provided to divide the region where the plurality of micromirrors 402 are arranged from the address electrode connecting opening 412.

The silicon mirror substrate 400 is fabricated in quantity on a single silicon substrate, and during a dicing operation is separated from other silicon mirror substrates at the four positions A to D shown in FIG. 8.

The glass electrode substrate 500 shown in FIG. 8 has a depression 502 formed in the central region, and a rim portion 504 around the periphery thereof in the form of a rim. At positions corresponding to the divider 414 of the silicon mirror substrate 400 the depression 502 is provided with intermediate ribs 506. Additionally, at positions between two micromirrors 402 adjacent in the x-direction in FIG. 8, and opposite the torsion bars 404 the depression 502 is provided with pillars 508. In the depression 502 of the glass electrode substrate 500, on both sides of the intermediate ribs 506 are formed a plurality of wiring pattern portions 510 extending in the y-direction in FIG. 8. These wiring pattern portions 510 have first and second address electrodes 512 and 514 opposing two regions of the micromirrors 402 bounded by the torsion bars 404. Moreover, the first address electrodes 512 extending in the y-direction in FIG. 8 are connected in common with first common wiring lines 516. Similarly, the second address electrodes 514 extending in the y-direction in FIG. 8 are connected in common with second common wiring lines 518. Furthermore, the end portions 516a and 518a of the first and second common wiring lines 516 and 518 are formed to extend to positions beyond the intermediate ribs 506.

The glass electrode substrate 500 is also fabricated in quantity on a single glass substrate, and is later subjected to a dicing operation to form a single spatial light modulator.

When the glass electrode substrate 500 is anode-bonded with the silicon mirror substrate 400, the end portions 516a and 518a of the first and second common wiring lines 516 and 518 are exposed through the address electrode connecting opening 412 formed as an opening in the silicon mirror substrate 400. When the silicon mirror substrate 400 and glass electrode substrate 500 are anode-bonded, as in the first embodiment, the end portions 404a and 404b of the torsion bars 404 and the frame portion 406 on the silicon mirror substrate 400 are bonded with the rim portion 504 of the glass electrode substrate 500. Furthermore, intermediate portions of the torsion bars 404 of the silicon mirror substrate 400 are anode-bonded to the pillars 508 of the glass electrode substrate 500. In this second embodiment moreover, the divider 414 of the silicon mirror substrate 400 is also bonded to the intermediate ribs 506 of the glass electrode substrate 500.

The cover glass 600 shown in FIG. 8 has a depression 602 disposed opposite the disposition regions of the plurality of micromirrors 402 formed on the silicon mirror substrate 400. Around the periphery of this depression 602 is formed a rim 604. In the fabrication process a plurality of the cover glasses 600 are fabricated on a single glass substrate and by dicing this glass substrate a single cover glass 600 as shown in FIG. 8 is constructed. One side 604a of the rim 604 is disposed to overlay one end 404a of each of the torsion bars 404 which have been subject to dicing. Another side 604b of the rim 604 parallel to said side 604a is disposed in a position to overlay the other end 404b of each of the torsion bars 404 which have been subject to dicing. As a result, the mirror electrodes 410 of the silicon mirror substrate 400 are exposed to the exterior. The remaining two sides 604c and 604d of the rim 604 at right angles to the above two sides 604a and 604b are disposed in positions to overlay the frame portion 406 and divider 414 of the silicon mirror substrate 400 respectively.

As a result, as shown in FIG. 9, the address electrode connecting opening 412 formed as an opening in the silicon mirror substrate 400 is exposed to the exterior, and wiring connections can be made to the first and second common wiring lines 516 and 518 formed on the glass electrode substrate 500. After these wiring connections have been made, the address electrode connecting opening 412 is sealed with a sealing material. Further, when the above-described dicing process is carried out, in the regions where the ends 404a and 404b of the torsion bars 404 are not present, as shown in FIG. 9, a gap 511 equivalent to the thickness of the torsion bars 404 between the rim portion 504 of the glass electrode substrate 500 and the rim 604 of the cover glass 600 will be created. This gap 511 is also sealed with a sealing material in the same way as described above.

Fabrication Process of Spatial Light Modulator

The fabrication process of a spatial light modulator of the second embodiments described with reference to FIG. 10. The fabrication process of the glass electrode substrate 500 is substantially the same process as the process shown in FIG. 5. Since the cover glass 600 has the depression 602 formed by etching, the process of FIGS. 5b to 5d may be applied.

Next the points particular to the fabrication process of the spatial light modulator of the second embodiment are described.

(1) Formation of boron doped layer 422

Figure 10A:
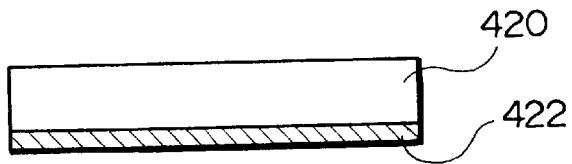
FIGS. 10A, 10B, 10C, 10D, 10E, 10F, 10G, and 10H are each schematic sectional drawings illustrating fabrication steps of the device shown in FIG. 8.

In FIG. 10A, on one surface of a silicon substrate 420 is formed a boron doped layer 422. The formation of this boron doped layer 422 is carried out in the same way as in the first embodiment.

(2) Anode bonding of substrates 400 and 500

Figure 10B:
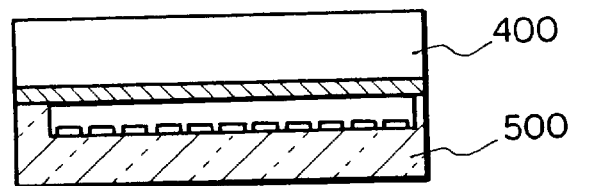

A particular feature of the fabrication process of the spatial light modulator of the second embodiments that as shown in FIG. 10B, the silicon substrate 420 on which the boron doped layer 422 has been formed is anode-bonded to the glass electrode substrate 500.

The anode bonding of the two substrates 400 and 500 is carried out in the same way as in the first embodiment, using the apparatus shown in FIG. 6. Specifically, the glass electrode substrate 500 mounted on the hot plate 310 is heated to between 250 and 450° C., and for example to 350° C. At the same time, the substrates 400 and 500 are connected to a DC power supply 312, while a negative voltage is applied to the glass electrode substrate 500 connected to the negative terminal a position voltage is applied to and the silicon mirror substrate 400 connected to the positive terminal. In this way, the Na+ ions in the glass electrode substrate 500 become motile, imparting a negative charge to the bonding surface of the glass electrode substrate 500, and a positive charge to the bonding surface of the silicon mirror substrate 400, whereby a large Coulomb force is generated between the two bonding surfaces, and electrostatic bonding is carried out.

The reason that the spatial light modulator of the second embodiments adapted to high density mounting is that when the substrates 400 and 500 are anode-bonded, the process can be completed without requiring the high-precision positioning of the micromirrors and wiring pattern which in the first embodiment have already been formed. This high-precision positioning is required in the patterning of the reflecting layer 402a shown in FIG. 10E.

(3) Step of wet-etching silicon substrate 420

Figure 10C:
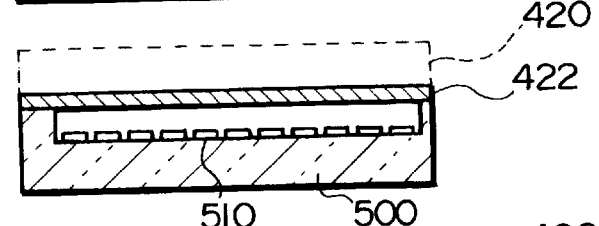

As shown in FIG. 10C, the silicon substrate 420 formed above the boron doped layer 422 is etched completely. This wet etching uses the same aqueous solution of KOH of a concentration of for example from 1 to 40% by weight, and follows the same etching reaction as shown in the first embodiment to etch away the silicon. The etching completion can be detected by observing the generation of hydrogen bubbles by the reaction with the silicon substrate 420, and determining the point when bubbles stop being generated as the completion point. Alternatively, by making the impurity concentration of the boron doped layer 422 at least $1 \times 10^{18}$ atm/cm$_3$, the boron doped layer 422 can be used to function as an etching stop layer.

It should be noted that the solvent used for wet etching is not restricted to an aqueous solution of KOH, and an aqueous solution of TMAH, an aqueous solution of EPD, or an aqueous solution of hydrazine may also be used.

(4) Vapor deposition of reflecting layer 402a

Figure 10D:
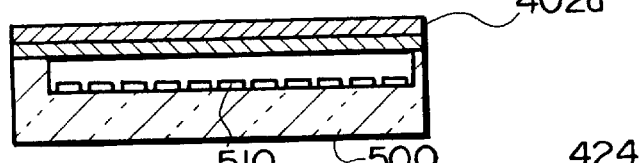

As shown in FIG. 10D, a reflecting layer 402a is formed on the whole surface of the boron doped layer 422. The reflecting layer 402a is formed of for example aluminum (Al) by vapor deposition. The thickness of the reflecting layer 402a is, as in the first embodiment, from 0.2 to 2 μm.

(5) Step of patterning reflecting layer 402a

Figure 10E:
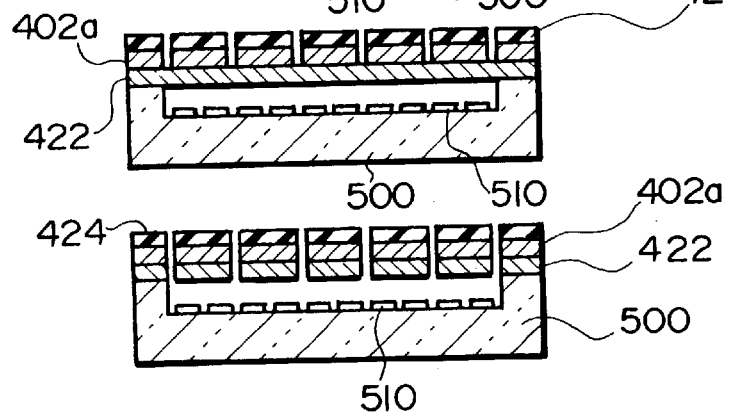
Figure 10F:
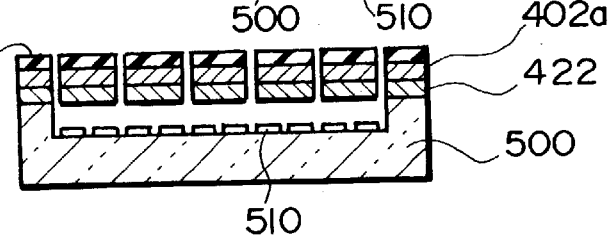
Figure 10G:
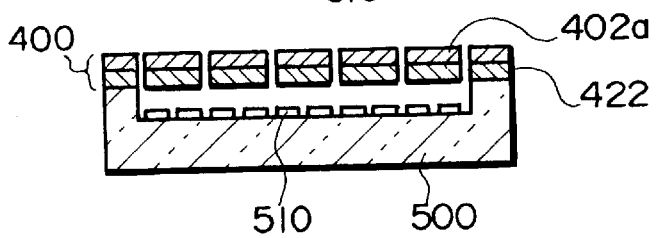
Figure 10H:
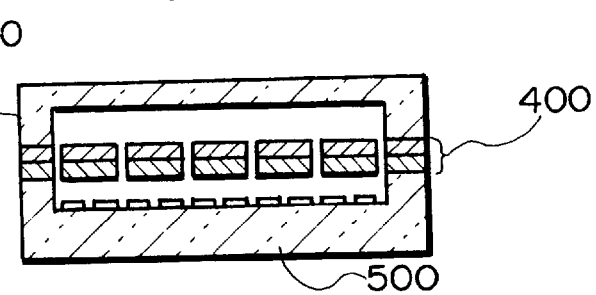

As shown in FIG. 10E, by a photolithography process, a resist pattern 424 is formed on the reflecting layer 402a. This resist pattern 424 corresponds to the micromirrors 402, torsion bars 404, frame portion 406, slits 408, mirror electrodes 410, address electrode removing opening 412, and divider 414 formed on the silicon mirror substrate 400 shown in FIG. 8.

When the reflecting layer 402a is formed of aluminum (Al), wet etching can be carried out using a mixture of phosphoric acid, acetic acid and nitric acid heated to 30° C., and immersing for 3 minutes. By this means as shown in FIG. 10E, the reflecting layer 402a can be patterned.

At this time, if a double-sided alignment apparatus is used, the patterning can be carried out with an accuracy of 0.5 μm. Specifically, from below in FIG. 10E, that is, from below the glass electrode substrate 500 the position of the wiring pattern portions 510 can be recognized through a microscope, and at the same time it is possible to measure through a microscope from above the silicon mirror substrate 400. Thus, using the position of the wiring pattern portions 510 formed on the glass electrode substrate 500 as a datum, the exposure stage for forming the resist pattern 424 can be carried out. By this means, portions of the resist pattern 424 opposite to the micromirrors 402 and so forth can be formed in positions corresponding to the first and second address electrodes 512 and 514 of the wiring pattern portions 510, and patterning can be accurate even when the mounting density is increased.

Before the bonding of the two substrates 400 and 500, if the gap therebetween should contain foreign objects, it is extremely difficult to remove these foreign objects. If foreign objects adhere to the wiring pattern portions 510 of the glass electrode substrate 500, when the micromirrors 402 are driven in an inclining manner, a short circuit will occur, causing a defective product, and a reduction in yield.

In answer to this, in the second embodiment, before the anode bonding of the two substrates 400 and 500, light is shone from the transparent glass electrode substrate 500 side to check for the ingress of foreign objects. At this point, it is preferable that the wiring pattern portions 510 formed on the glass electrode substrate 500 are not of a metal such as aluminum or silver, but of a transparent electrode substance such as ITO. In this way, foreign objects adhering to the ITO surface can also be detected.

(6) Dry etching of boron doped layer 422

For the etching of the boron doped layer 422, dry etching is more appropriate than wet etching. The reason for this is that in the process of wet etching the boron doped layer 422, in the steps of etching, washing, and drying, foreign objects may be introduced from the outside, or drying marks may occur, whereas in dry etching these problems do not occur.

For the dry etching of the boron doped layer 422 the resist pattern 424 is of a mask material resistant to etching. This dry etching can be carried out under the same conditions as the process of FIG. 4F in the first embodiment.

(7) Step of removing resist pattern 424

The resist pattern 424 can be removed, for example using a UV ashing device, in a dry process of ashing.

(8) Step of bonding cover glass and silicon mirror substrate

As in the first embodiment, the cover glass 600 does not require high precision bonding, and therefore in place of anode bonding, an adhesive bonding method may equally be used.

(9) Sealing process

To prevent the ingress of water or foreign objects in the dicing operation, as shown in FIG. 9, the address electrode removing opening 412 is sealed with a sealing material. Furthermore, the very small gap 511 which is generated by the dicing process is also later sealed in the same way.

(10) Dicing process

In the process described above, a plurality of the substrates 400, 500, and 600 constituting a plurality of the spatial light modulator elements are fabricated on single silicon and glass substrates. After the cover glass 600 bonding process is completed, each of the individual spatial light modulator elements is separated by a dicing process. In this dicing process, the substrates 400, 500, and 600 are each diced, at the four positions A to D shown in FIG. 8. In this way, the torsion bars 404 which were coupled together during the assembly process are each separated.

(11) Wiring process

Finally, the mirror electrodes 410 and the ends 512*a* and 512*b* of the first and second address electrodes 512 and 514 of the separated spatial light modulator are connected to a drive circuit not shown in the drawings. In this way, the spatial light modulator is completed.

In the first and second embodiments described above, anode bonding is described as an example method for bonding the silicon mirror substrate and the glass electrode substrate, but other methods can also be used in place of this. As other examples direct bonding and diffusion bonding can be cited.

Direct bonding can be used when the mirror substrate and electrode substrate are both silicon substrates. The silicon substrates are well washed, and after giving good wettability to the bonding surfaces of the silicon substrates, for example an infrared microscope is used to provisionally position the substrates at room temperatureare. Next, the provisionally positioned silicon substrates are heated to 800 to 1200° C., with an optimal temperature of 1100° C., and are heat-processed for 1 to 4 hours in a nitrogen atmosphere, whereby the silicon substrates can be directly bonded together. In this case, when the wettability of the silicon substrates is good, the silicon surface elements are bonded as Si—O—H. When heat treatment is applied, by a reaction involving the loss of water, these are converted to Si—O—Si bonds, and the silicon substrates are bonded together.

An example of diffusion bonding is eutectic bonding, which can be used when the electrode substrate bonding surface is of aluminum (Al) or gold (Au). These metals easily form an alloy at relatively low temperatures from 300 to 350° C. If for example a gold film is formed on the electrode substrate by sputtering, and this gold film is brought into contact with the silicon mirror substrate, and subjected to heat treatment at 300 to 400° C. for 1 to 2 hours. The gold diffuses into the silicon at the bonding interface, and the bonding interface disappears to form a bond. This is not restricted to eutectic bonding, and a diffusion bonding may be used in which metals easily forming an alloy are formed on each of the electrode substrate and the silicon mirror substrate. These metals are heated, and at the bonding interface one metal diffuses into the other metal.

In this way, various materials may be used for the electrode substrate, according to the bonding method to be used. However, if the bonding involves the application of heat, the material should preferably have a coefficient of thermal expansion close to that of silicon.

Third Embodiment

The third embodiment described here is constructed so as positively to prevent a short-circuit between the micromirrors 402 and the first and second address electrodes 512 and 514. As shown in FIG. 11A, on the surface of the micromirrors 402 facing the first and second address electrodes 512 and 514 is formed an insulating film 416. In this way, even if a foreign object 10 is present between the micromirror 402 and the first and second address electrodes 512 and 514, by means of the insulating film 416 a short-circuit between the micromirrors 402 and the first and second address electrodes 512 and 514 is prevented.

Figure 11B:
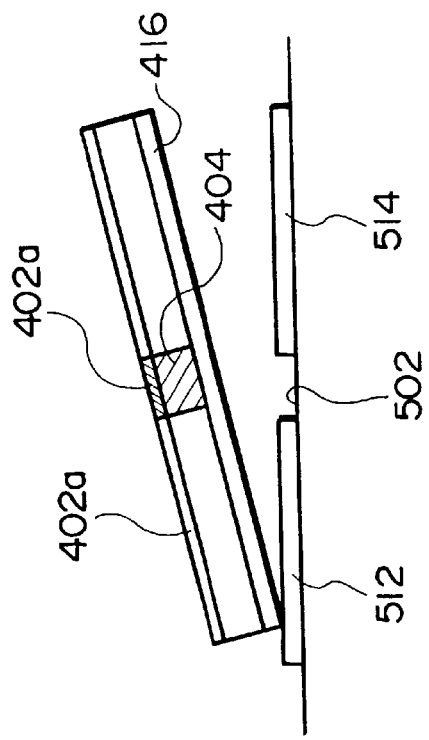
FIGS. 11A and 11B are each schematic sectional drawings illustrating a third embodiment of the present invention in which an insulating film is formed on the reverse side of a micromirror.
Figure 11A:
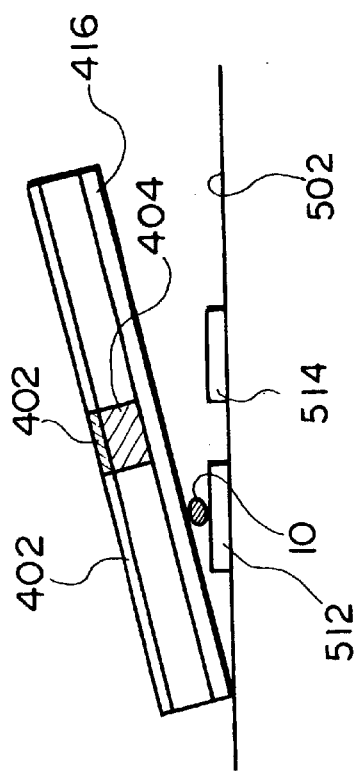

When the insulating film 416 is formed on the reverse side of the micromirrors 402, as shown in FIG. 11B, the first and second address electrodes 512 and 514 may also serve as stoppers for determining the deflection angle of the micromirrors 402 when deflected. This insulating film may, for example, in the case of the spatial light modulator shown in the first embodiment be formed by omission of the step of removing the thermal oxidation film shown in FIG. 4G. In other words, the thermal oxidation film 114 formed in FIG. 4C can be used also as the insulating film.

To prevent a short-circuit between the micromirrors 402 and the first and second address electrodes 512 and 514, it is equally possible to provide an insulation film on the surfaces of the first and second address electrodes 512 and 514 film for example by using a sputtering device.

When the insulating film 416 is formed on the reverse side of the micromirrors 402, the surface of the first and second address electrodes 512 and 514 may be made rough. By doing this, the contact area between the micromirrors 402 and the first and second address electrodes 512 and 514 can be reduced. If the surface is not made rough, a hot carrier charge occurs on the insulating film 416 formed on the micromirrors 402, and the micromirrors 402 sticks to the electrodes 512 and 514. Simply by making the surface of the electrodes 512 and 514 rough, this problem can be avoided. This surface roughness can be provided by forming an electrode surface with projections of height preferably at least 200 Angstroms.

To provide the surface roughness on the surface of the first and second address electrodes 512 and 514, for example when forming a film by the sputtering method, the conditions may be varied to use larger sputter particles. Alternatively, if the electrodes 512 and 514 are formed by vapor deposition, the surface will be rough.

Alternatively, in an etching step for forming the depression 202 and other elements shown in FIG. 5C, by varying the etching conditions to provide a rough etched surface, the ITO film can be formed thereon with the surface roughness required.

Figure 12:
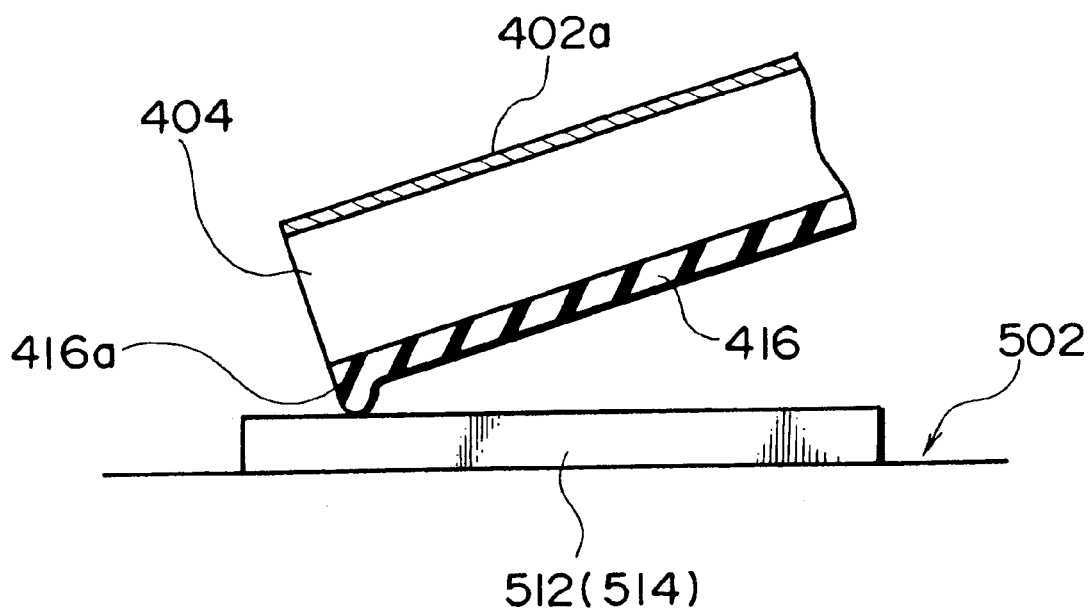
FIG. 12 is a schematic sectional drawing illustrating a variant of the third embodiment in which a micropyramid is formed at the extremities of the insulating film formed on the reverse side of the micromirror.
Figure 13:
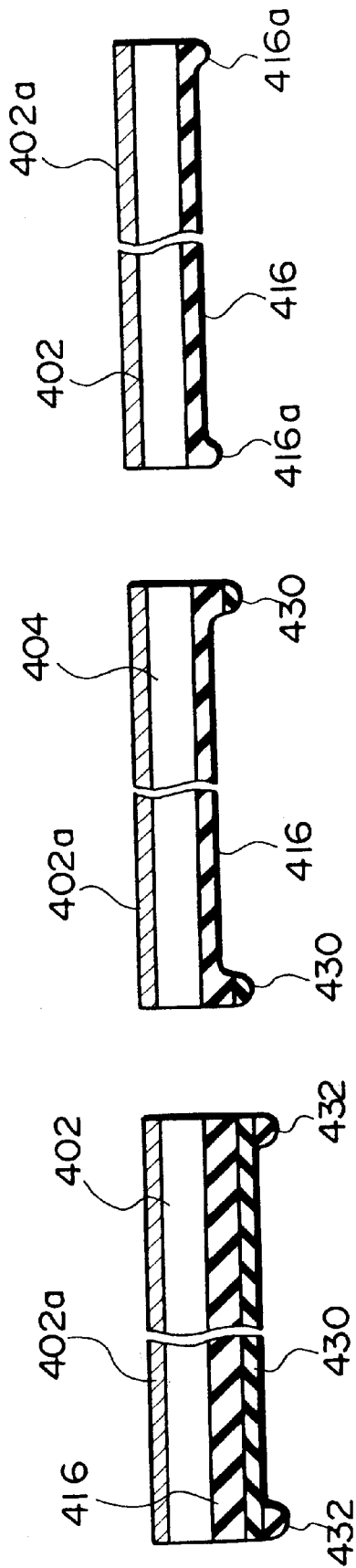
FIGS. 13A, 13B, and 13C are each schematic sectional drawings illustrating formation steps of the micropyramid shown in FIG. 12.

To reduce the contact area between the micromirrors 402 and the first and second address electrodes 512 and 514, as shown in FIG. 12, it is also possible to form at each end of the micromirror 402 a micropyramid 416a forming part of the insulating film 416 projecting downward. To form such micropyramids 416a, the steps shown in FIGS. 13A to 13C may be carried out. First, as shown in FIG. 13A a first level oxide film 430 is formed on the insulating film 416. Next, on this first oxide film 430, and in positions corresponding to the ends of the micromirrors 402 are formed localized second oxide films 432.

Next, the first and second oxide films 430 and 432 are etched. By doing this, as shown in FIG. 13B, if the etching rate is constant over the whole surface, even after the first oxide film 430 in the central region is completely removed, the peripheral portion of the first oxide film 430 remains. Thereafter, as the etching proceeds, only the surface of the central region of the insulating film 416 is etched, and the insulating film 416 at the extremities is not etched.

Then, as shown in FIG. 13C, by removing the oxide film remaining on the extremities, a micropyramid 416a formed on the insulating film 416 can be formed at both ends of the micromirror 402.

Figure 14:
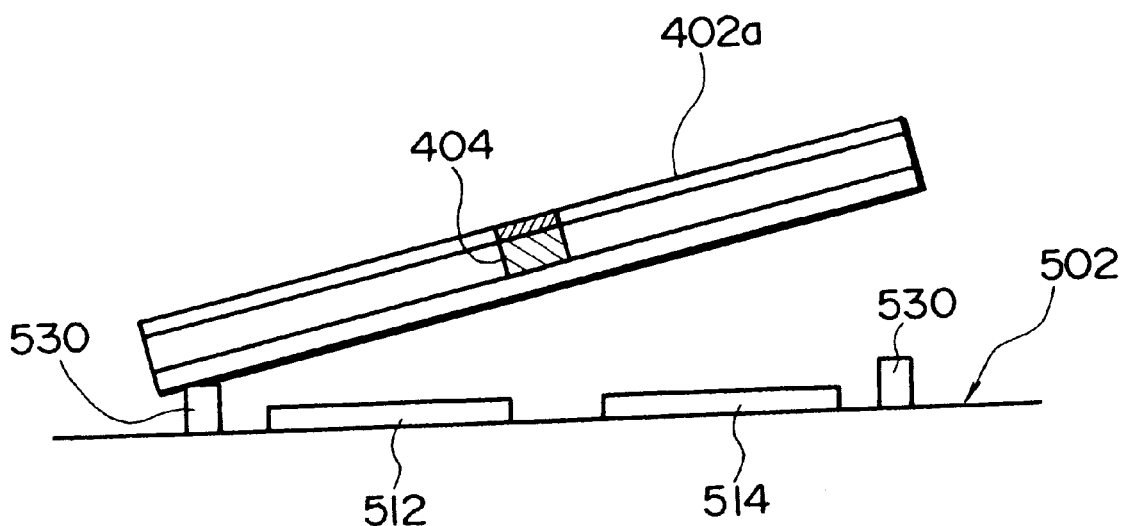
FIG. 14 is a schematic drawing illustrating a variant of the third embodiment in which an insulating stopper is provided on the glass electrode substrate.

To eliminate static charging of the insulating film 416 formed on the reverse surface of the micromirrors 402 by the first and second address electrodes 512 and 514, as shown in FIG. 14, an insulating stopper 530 may be provided, projecting from the depression 502 of the glass electrode substrate 500. In this way, even when the micromirrors 402 are driven in an inclining manner, since they have a larger distance between the insulating film 416 on the reverse surface and the first and second address electrodes 512 and 514, the problem of sticking of the micromirrors 402 because of static charging is avoided.

Fourth Embodiment

Figure 15:
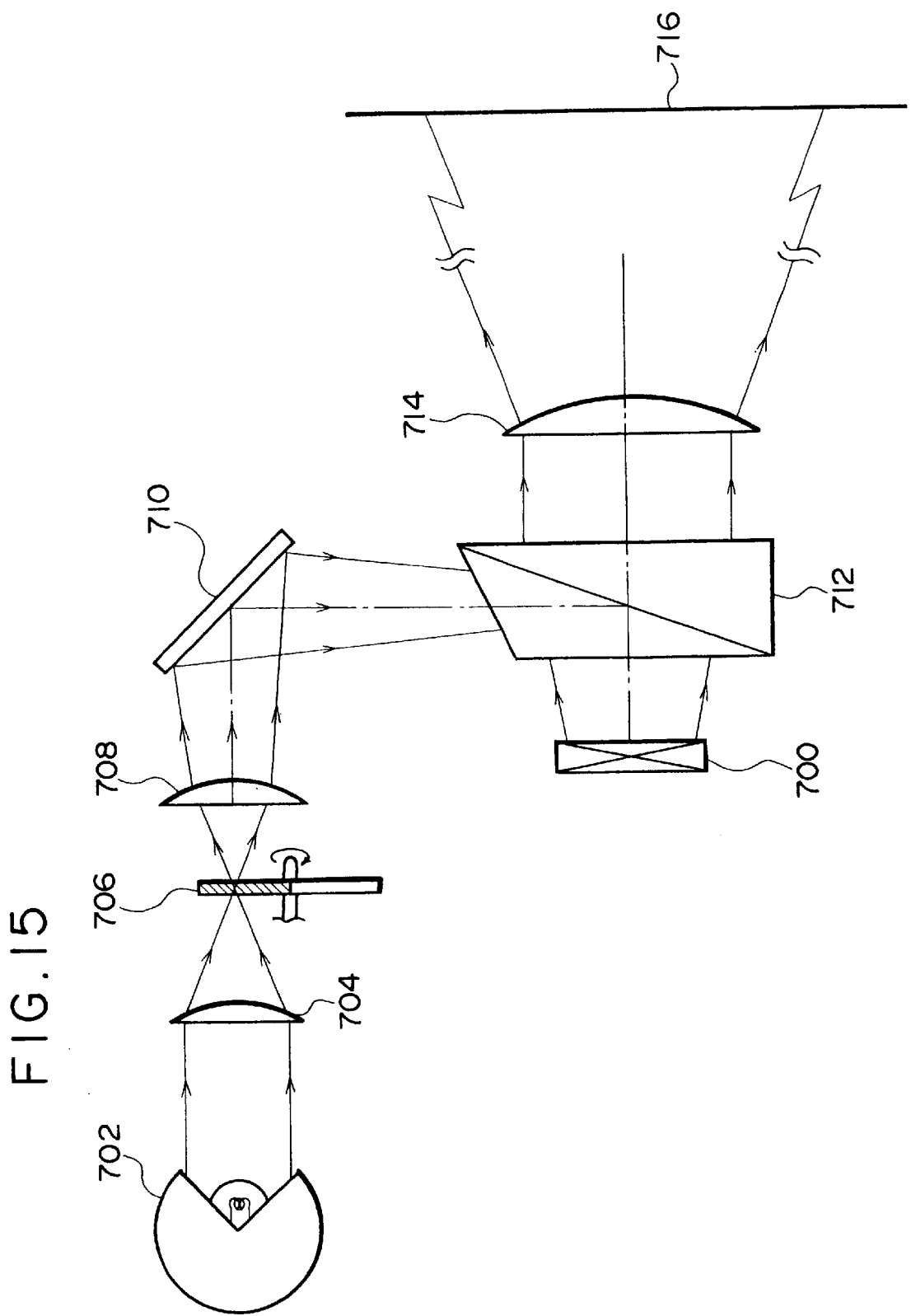
FIG. 15 is a schematic drawing of a fourth embodiment of the present invention, constituted by a projector provided with a single spatial light modulator.
Figure 16:
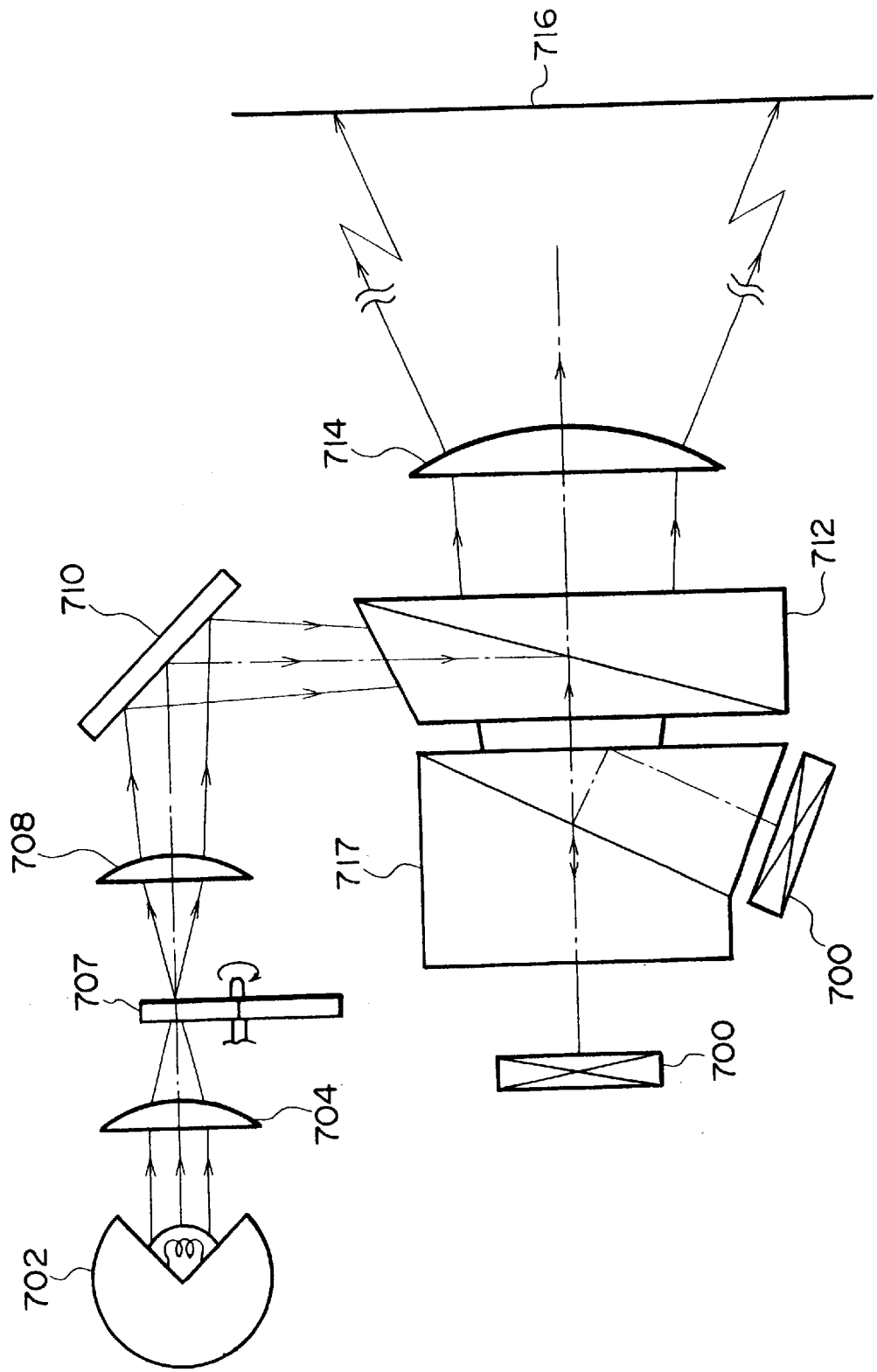
FIG. 16 is a schematic drawing of a variant of the fourth embodiment of the present invention, constituted by a projector provided with a double spatial light modulator.
Figure 17:
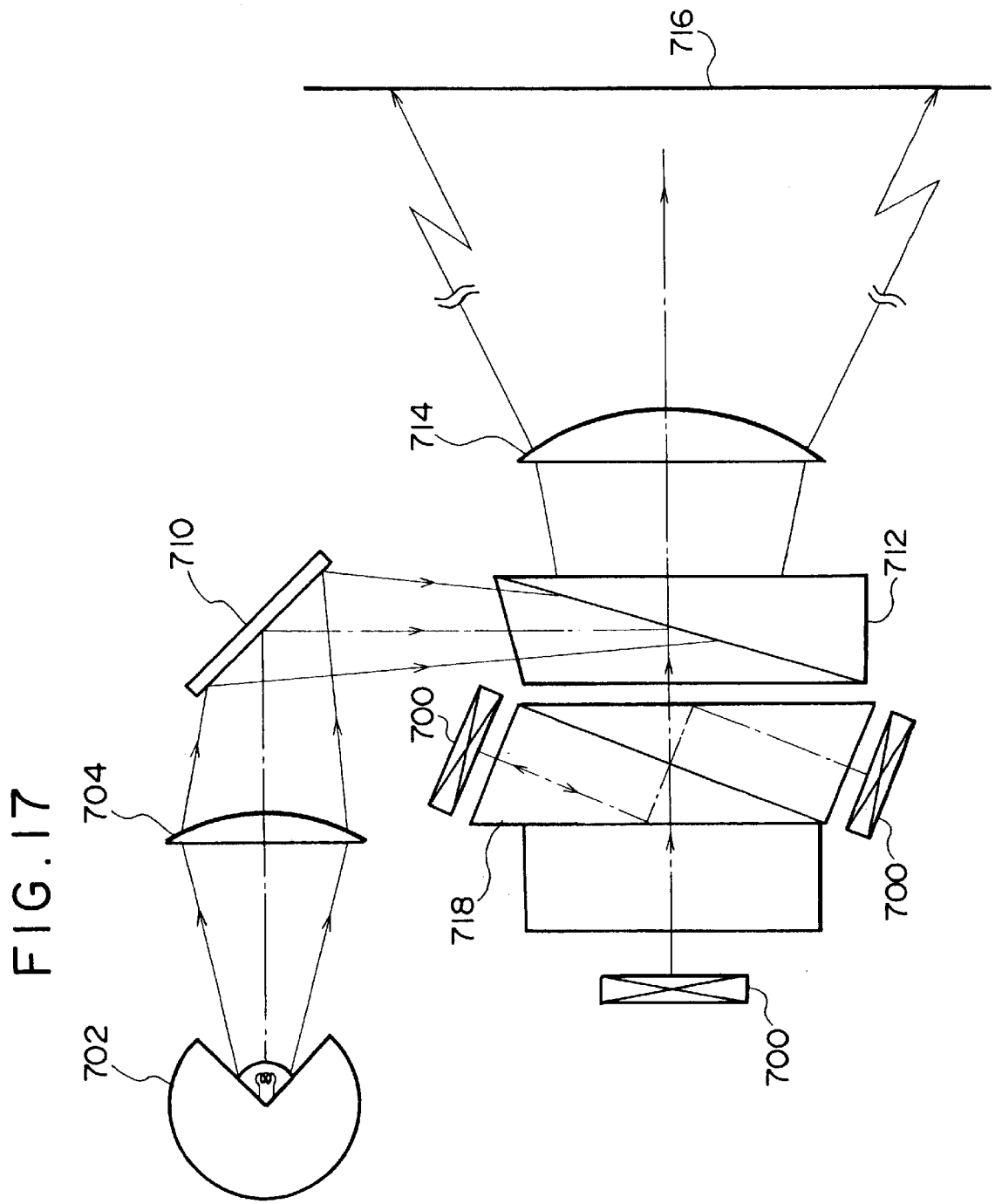
FIG. 17 is a schematic drawing of a variant of the fourth embodiment of the present invention, constituted by a projector provided with a triple spatial light modulator.

An embodiment constituting a projector, using the spatial light modulator of the first embodiment or second embodiment is described, with reference to FIGS. 15 to 17.

FIG. 15 shows an embodiment constituting a projector using a single spatial light modulator 700. As shown in this figure, white light emitted by a projection lamp 702 passes through a condenser lens 704 to be concentrated on a rotary color filter 706. This rotary color filter 706 has filters of three colors: red ("R"), green ("G"), and blue ("B"). By rotatably disposing the three color filters at the concentration position of the condenser lens 704, wavelengths of light of the sequentially changing colors are passed through the filters.

Light passing in sequence through the "R" "G" and "B" filters of the rotary color filter 706 then goes via a condenser lens 708, a reflecting mirror 710, and a half prism 712, to impinge on the spatial light modulator 700. In this spatial light modulator 700, based on an image signal input from the outside, using the drive mechanism described above, the micromirrors are driven in an inclining manner in a scan in the x-direction (horizontal direction) from one end in sequence, while scanning sequentially in the y-direction (vertical direction), to cause the impinging light to be reflected from the individual micromirrors disposed in a matrix. By this means, for each pixel of the matrix in which the micromirrors are disposed, reflected light modulated according to gradation can be obtained.

This reflected light passes through the half prism 712 as parallel light, to impinge on a projection lens 714, and through the projection lens 714 to be projected enlarged on a screen 716.

The spatial light modulator 700 of this embodiment has an optical efficiency at least three times as high as a conventional liquid crystal panel, which has a low optical efficiency because of the use of polarizing filters. The spatial light modulator 700 of this embodiment is thus able to display an image of adequate brightness on the screen 716.

Moreover, the response time of the micromirrors at 20 µs, is vastly faster than the 30 ms of a conventional liquid crystal panel which allows flickering on the screen to be prevented. Furthermore, in the use of a conventional liquid crystal panel, because of the low optical efficiency three liquid crystal panels are required, corresponding to "R" "G" and "B". As a result, the alignment of the optical axes is extremely troublesome.

On the other hand, using the spatial light modulator 700 in this embodiment an adequate brightness can be obtained with the single spatial light modulator shown in FIG. 15, and alignment adjustment is extremely easy.

It should be noted that the spatial light modulator 700 can also be used in a double or triple configuration as shown in FIGS. 16 or 17. In the case shown in FIG. 16 the rotary color filter 707 has "G" and "B" filters, and in the first stage of the two spatial light modulators 700 a separating prism 717 is disposed to separate the light into two wavelength regions. On the other hand, in FIG. 17, no rotary color filter is used, and in the first stage of the three spatial light modulators 700 a separating prism 718 is disposed to separate the light into three wavelength regions. In this way, each of the spatial light modulators 700 may be shared by wavelengths of two colors, or may be disposed in second or third stages for each wavelength independently. By this means, a brighter and clearer image can be projected on the screen 716.

Fifth Embodiment

Figure 18:
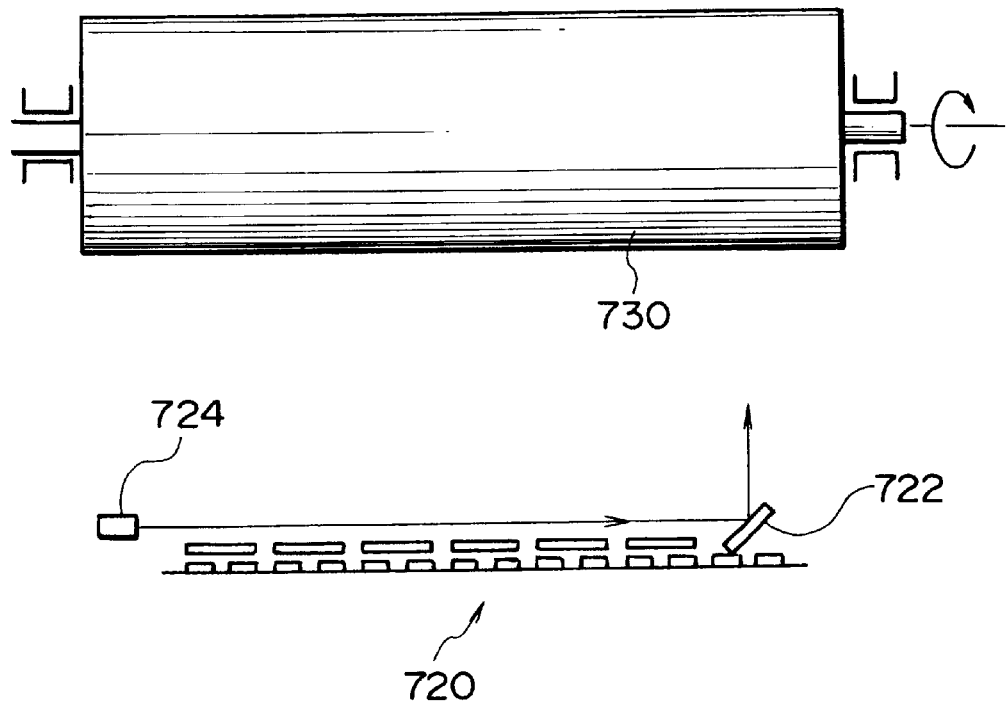
FIG. 18 is a schematic drawing of a fifth embodiment of the present invention, constituted by electronic photography apparatus which uses the spatial light modulator of the present invention in place of a polygonal mirror.

FIG. 18 shows an embodiment constituting a spatial light modulator 720 of this embodiment applied to an electronic photography apparatus, such as a laser printer. In this embodiment, the spatial light modulator 720 is used in place of a conventional polygonal mirror. In this figure, the spatial light modulator 720 has a plurality of micromirrors 722 arranged parallel to a beam of laser light emitted by a laser light source 724.

In FIG. 18, the micromirror 722 positioned at the right-most end is shown as driven in the "ON" position, and in the direction of travel of the reflected light reflected when a micromirror 722 is in the "ON" position, is disposed a photosensitive drum 730. At this time, the other micromirrors are in the "OFF" position, and do not block the passage of laser light.

Figure 19:
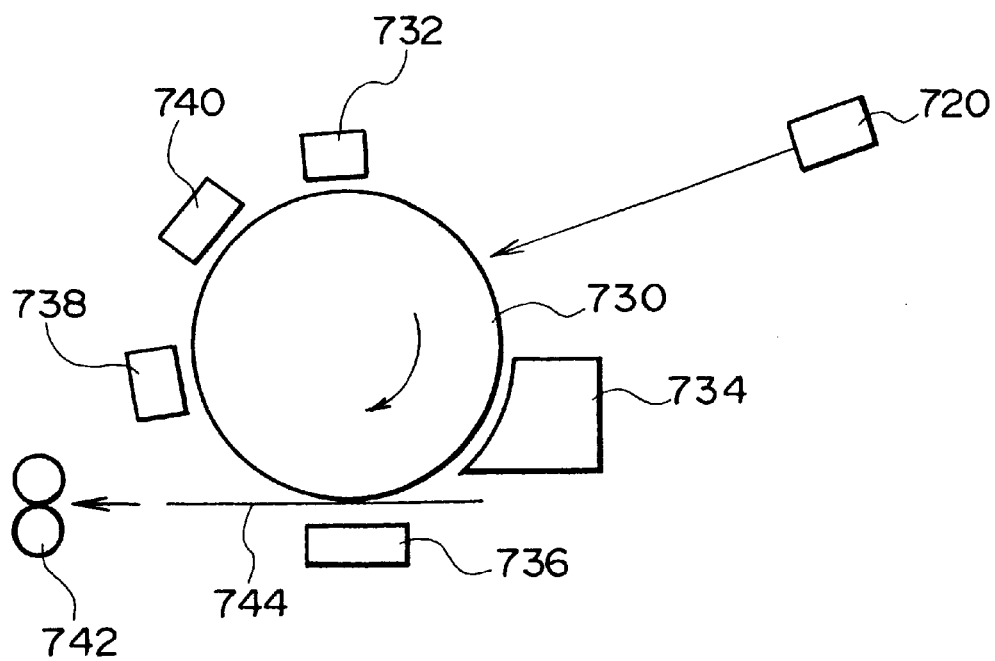
FIG. 19 is a schematic drawing illustrating the construction of the surroundings of a photosensitive drum of the electronic photography apparatus shown in FIG. 18.

The photosensitive drum 730 is, as shown in FIG. 19, rotatable in for example the clockwise direction. Around the periphery of the photosensitive drum 730 are disposed an exposure lamp 732, a developing device 734, a transfer device 736, a cleaning device 738, and a charge removal device 740. By scanning the micromirrors 722 of the spatial light modulator 720 shown in FIG. 18 sequentially from right to left, the surface charge on the photosensitive drum 730, which has already been charged to a particular level by the exposure lamp 732, is changed by the reflected light modulated by the micromirrors 722, to create a latent image. By means of the rotation of the photosensitive drum 730, toner is attached to the latent image by the developing device 734 to develop the image, and the toner is transferred to a storage medium 744 by the transfer device 736. The storage medium 744 is fixed by fixing rollers 742 disposed downstream, and is then ejected. After the completion of transfer, any remaining toner on the photosensitive drum 730 is recovered by the cleaning device 738, then charge is removed by the charge removal device 740 to restore the initial state.

In this way, according to this embodiment, the conventional polygonal mirror can be replaced by the spatial light modulator 720, and since the spatial light modulator 720 allows high density mounting and has a fast response speed, it is possible to record a high resolution image on the storage medium 744.

Sixth Embodiment

Figure 20:
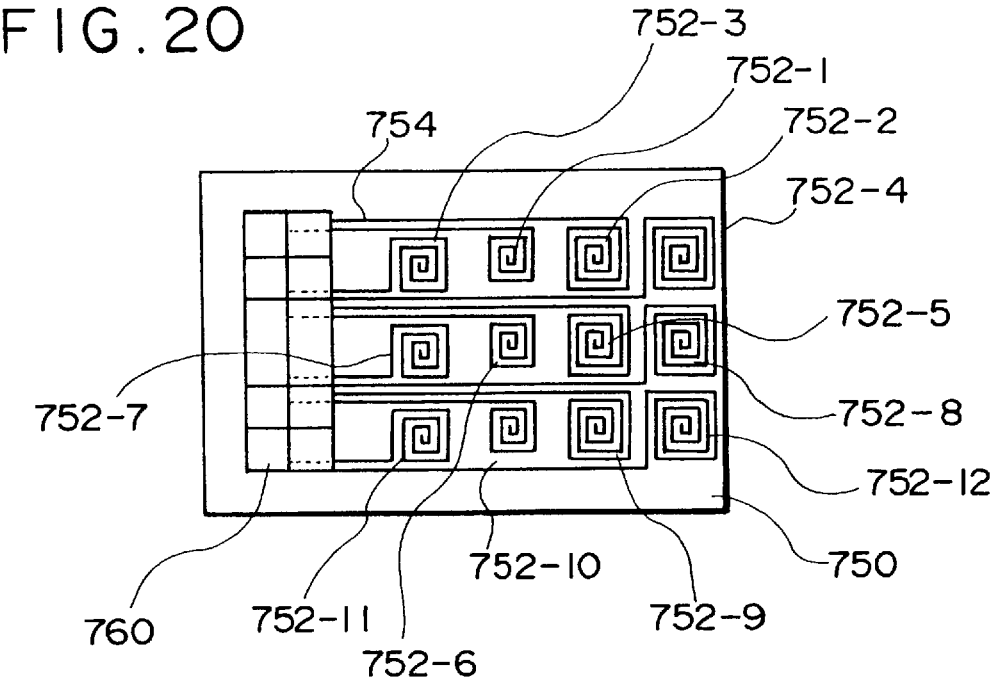
FIG. 20 is a schematic drawing of a sixth embodiment of the present invention in which the spatial light modulator is applied to an optical card as an optical switching device.
Figure 21:
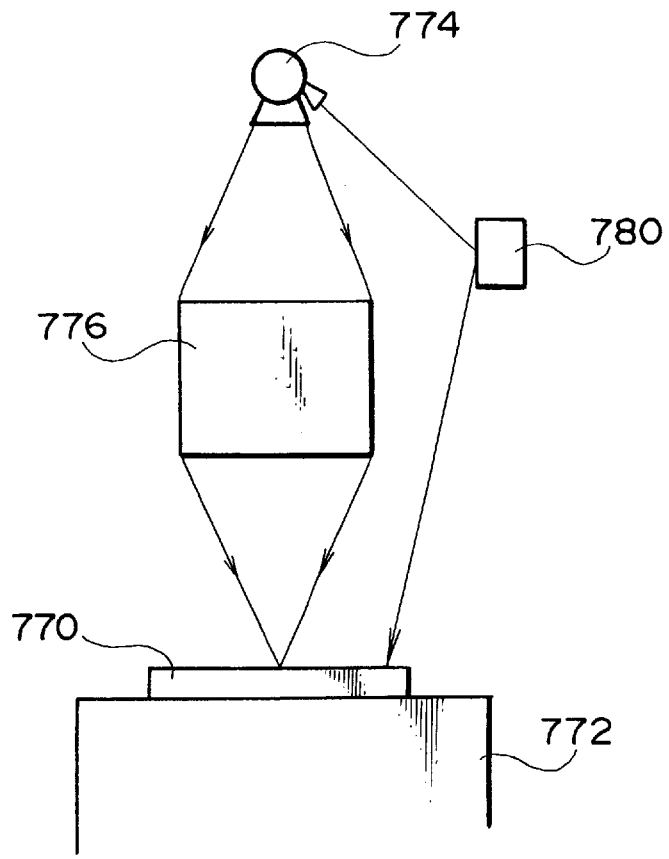
FIG. 21 is a schematic drawing of a seventh embodiment of the present invention, constituted by a spatial light modulator built into an exposure device.
Figure 22:
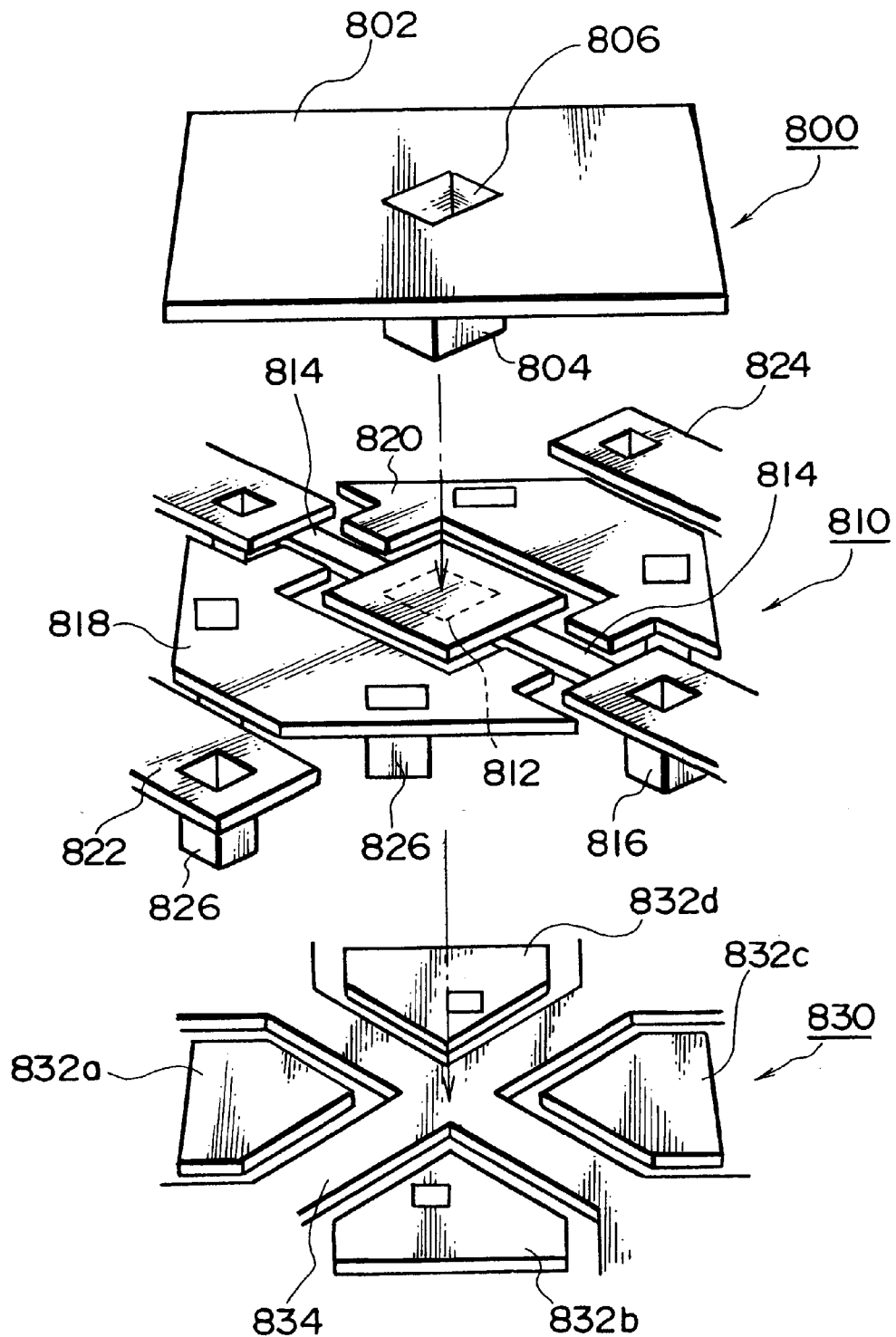
FIG. 22 is a perspective exploded assembly view of a conventional prior art spatial light modulator.
Figure 23:
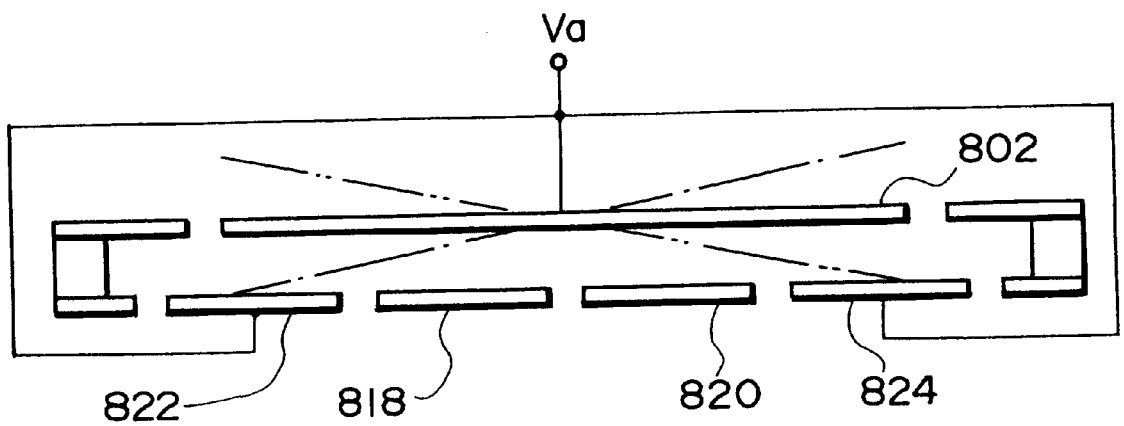
FIG. 23 is a schematic drawing illustrating the spatial light modulation operation of a conventional prior art spatial light modulator.
Figure 24A:
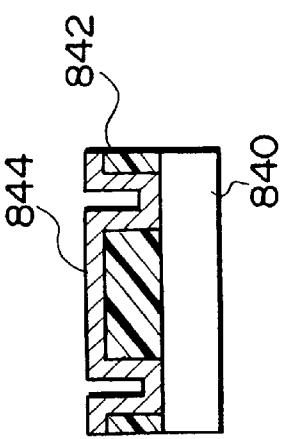
FIGS. 24A, 24B, 24C, 24D, 24E, 24F, 24G, and 24H show the fabrication process of the conventional prior art spatial light modulator shown in FIG. 22, and are each schematic drawings illustrating steps of forming an intermediate layer on a lower layer.
Figure 24B:
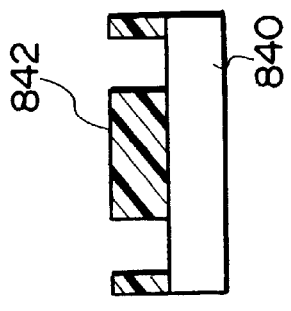
Figure 24C:
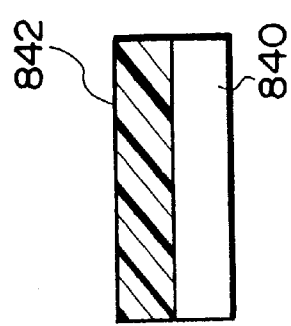
Figure 24D:
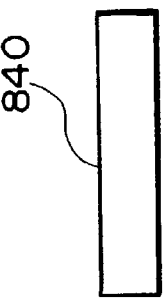
Figure 24E:
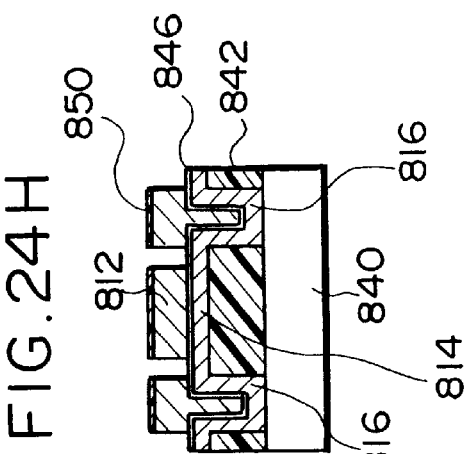
Figure 24F:
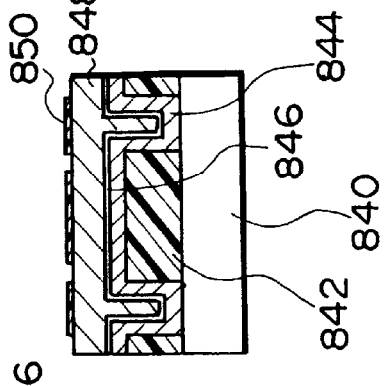
Figure 24G:
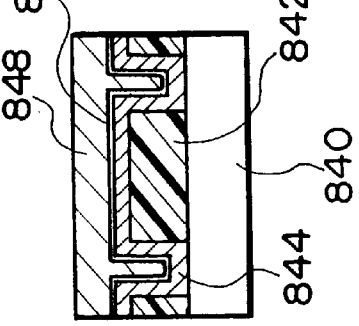
Figure 24H:
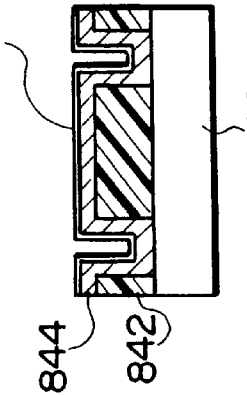

The sixth embodiment is an embodiment of the spatial light modulator of this embodiment applied to for example an optical card capable of optical switching. As shown in FIG. 20, on an insulating substrate 750 are provided a plurality of, for example twelve, induction coils 752-1 to 752-12, capable of generating desirable induction voltages.

At an end of the insulating substrate 750 is disposed the spatial light modulator 760. The induction coils 752-1 to 752-12 are connected through a wiring pattern 754 to first and second address electrodes corresponding to six micromirrors provided in the spatial light modulator 760.

When this optical card is inserted into a reading device capable of detecting optical switching signals from the optical card, the twelve induction coils 752-1 to 752-12 formed on the insulating substrate 750 are disposed corresponding to twelve induction coils on the reading device. By energization thereof, induction voltages are generated in each of the induction coils 752-1 to 752-12. Based on these induction voltages, the six micromirrors in the spatial light modulator 760 are driven in an inclining manner, and a modulated optical switching signal can be obtained by the reflection of light thereby.

Since the spatial light modulator 760 can be formed to be extremely small, it can easily be fitted into a portable card. Moreover, since this card is unrelated to the effect of magnetic fields, reading of the data in the card for criminal purposes is prevented.

Seventh Embodiment

The seventh embodiment uses a spatial light modulator 780 of the present invention built into an exposure device, for writing a lot number and other information specific to the wafer on the surface of a semiconductor wafer 770 being exposed.

Opposing a wafer mounting stand 772 on which the wafer 770 is mounted is provided a light source 774 for exposing the information on the wafer. Between the light source 774 and the wafer mounting stand 772, a reticle 776 is provided to project light emitted by the light source 774 as a predetermined mask pattern image at reduced size on the wafer 770. The spatial light modulator 780 built into this exposure device is disposed in a position to be impinged on by some of the light emitted by the light source 774. Furthermore, when the micromirrors are driven to the "ON" position, light reflected therefrom falls on a predetermined position on the wafer 770.

The wavelength of the light source 774 of the exposure device will be short: g-rays, i-rays, or excimer laser radiation as the element density increases. If light of these short wavelengths is modulated by an optical switching device using liquid crystals, the enclosed liquid crystals will soon deteriorate.

Because the present spatial light modulator 780 only reflects the short wavelength light from micromirrors, it has adequate durability.

In this way, using the present spatial light modulator 780, the short wavelength light from the light source 774 for exposure can also be used for recording ID information and the like on the wafer 770, and a separate light source is unnecessary.

The present spatial light modulator is not limited to application to the above-described devices, and can be applied to a range of devices in which light is modulated either at graduation, or simply in an on/off fashion. For example, by a construction so that the light reflected from the micromirrors of the spatial light modulator can be viewed directly, application to an advertising sign displaying characters including text and graphics, or to a watch display and so forth is possible.

Eighth Embodiment

Next, a spatial light modulator of an eighth embodiment according to the present invention, and the method of fabrication thereof are described.

Figure 26:
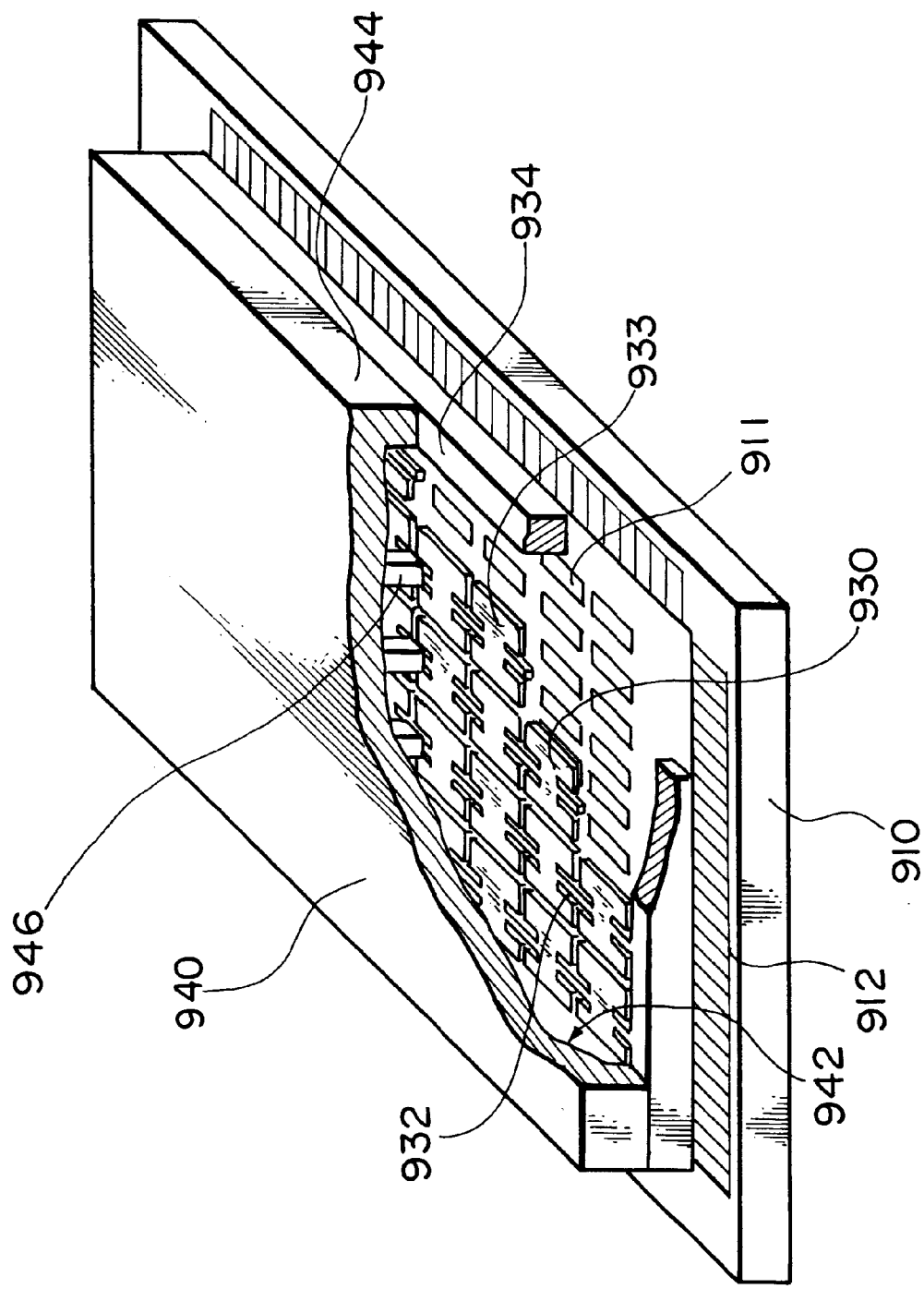
FIG. 26 is a perspective view of an eighth embodiment of a spatial light modulator according to the present invention.

FIG. 26 is a structural diagram of the present spatial light modulator of the eighth embodiment. In this figure, the spatial light modulator has a three-layer construction which can be divided broadly into a silicon circuit substrate 910 on which a drive circuit including an SRAM is formed, a silicon mirror substrate 920 on which micromirrors 930 are formed, and a glass substrate 940.

The plurality of micromirrors 930 formed on the silicon mirror substrate 920 are coupled in one direction by torsion bars 932, and both ends of these torsion bars 932 are fixed to a frame portion 934. The frame portion 934 is bonded between the silicon circuit substrate 910 and the glass substrate 940. Furthermore, the frame portion 934 is an important component in determining the gap between the micromirrors 930 and electrodes 911 on the silicon circuit substrate 910. In other words, the drive torque and deflection angle of the micromirrors 930 can be adjusted by the thickness of the frame portion 934.

The glass substrate 940 has a central depression 942, a rim portion 944 around the periphery thereof, and pillars 946 projecting from the depression 942. These pillars 946 abut a torsion bar 932 between two micromirrors 930 adjacent in one direction.

The depression 942, rim portion 944, and pillars 946 are formed by etching of the glass substrate 940.

Further, on the surface of the micromirrors 930 is formed a reflective film 933. The material of the reflective film 933 may appropriately be aluminum or silver with a high reflectivity of visible wavelengths of light.

Individual micromirrors 930 are formed communicatingly from silicon in which are diffused impurities of extremely high conductivity, and through the frame portion 934 are coupled to the drive circuit of the silicon circuit substrate 910. Based on driving by the drive circuit, an electrical field occurs between the surface electrodes 911 and the micromirrors 930, so that the positions of the micromirrors 930 can be varied.

Figure 27A:
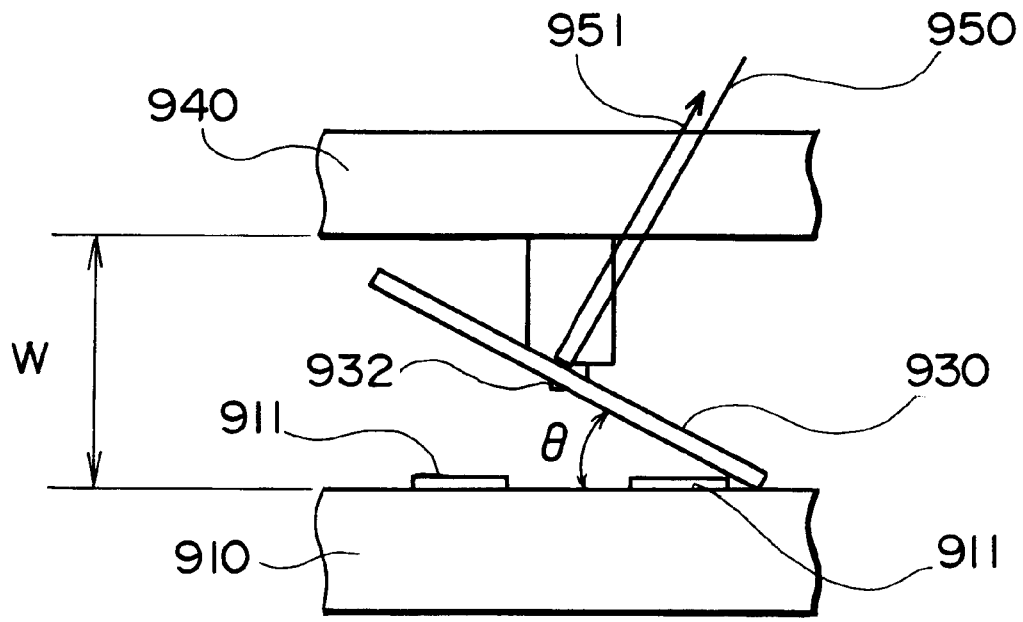
FIGS. 27A and 27B are each schematic drawings illustrating the operation of the micromirror of the spatial light modulator shown in FIG. 26.
Figure 27B:
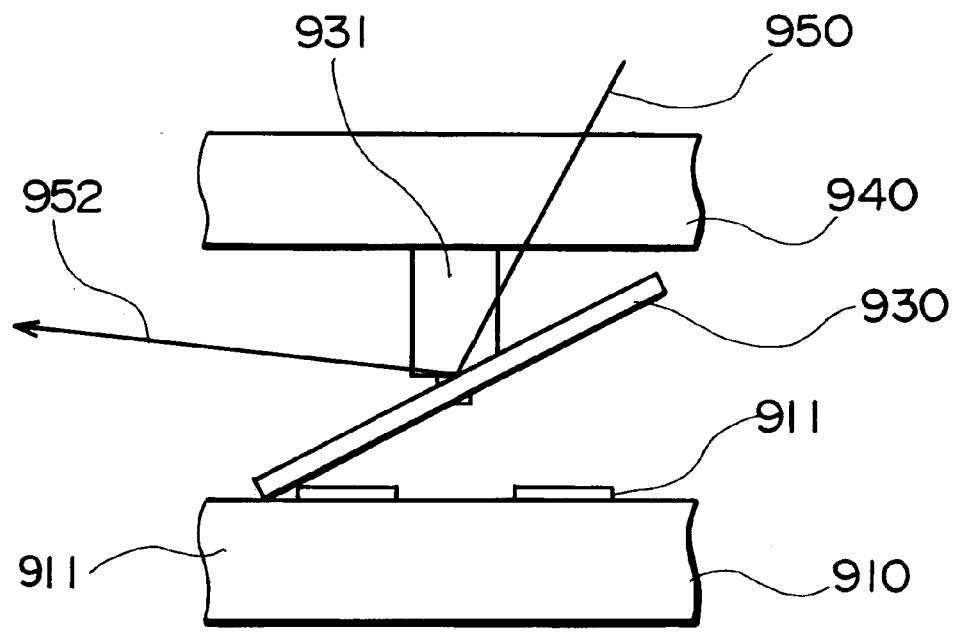

By varying the positions of the micromirrors 930, two reflection modes can be obtained: one, as shown in FIG. 27A, in which a light ray 950 impinging diagonally from the upper right is reflected back diagonally to the upper right as a light ray 951, and the other, as shown in FIG. 27B, in which the light ray 950 is reflected diagonally to the lower left as a light ray 952. Then by providing a projection lens in the onward path of the reflected light shown in FIG. 27B, for example a projector can be constructed.

Next the method of fabrication of this spatial light modulator is described.

FIGS. 28A to 28I show steps in the fabrication process of the spatial light modulator of the eighth embodiment according to the present invention.

Figure 28A:
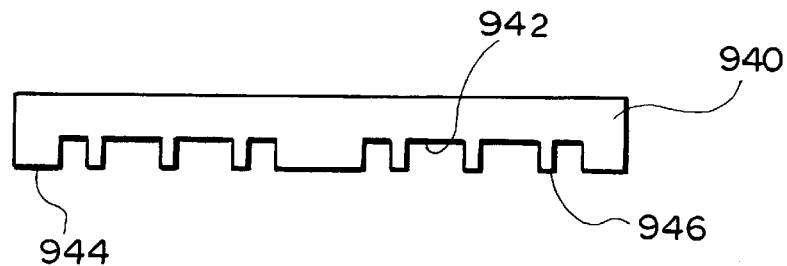
FIGS. 28A, 28B, 28C, 28D, 28E, 28F, 28G, and 28I are each schematic drawings illustrating fabrication steps of the spatial light modulator shown in FIG. 26.

First a glass substrate 940 whose principal component is borosilicate is painted with a resist, and a process of photolithography is applied to the resist to carry out patterning. Using the resist patterned in this way, the glass substrate 940 is wet-etched, whereby as shown in FIG. 28A the depression 942, rim portion 944, and pillars 946 are formed. Here the depth of this etching should not restrict the deflection angle of the micromirrors 930, and should therefore be more than the deflection half-amplitude (W/2) of the micromirrors 930 shown in FIG. 27A.

The deflection angle 6 shown in FIG. 27A can be found from the following expression:

$$\sin \theta = (\text{amplitude W/micromirror side length}) \quad (1)$$

Therefore, the deflection half-amplitude (W/2) of the micromirrors 930 is given by:

$$\text{Deflection half-amplitude (W/2)} = \text{micromirror side length} \times \sin \theta/2 \quad (2)$$

And it is necessary for the height of the pillars 946 to be more than this deflection half-amplitude (W/2).

The dimensions of a sample spatial light modulator are:

Micromirror side length: 16 $\mu$m

Micromirror thickness: 1 $\mu$m

Deflection angle: 10 degrees

From expression (2), the deflection half-amplitude (W/2) is 1.4 $\mu$m. In this case the pillars 946 are made with a height of 2 $\mu$m. The height of the pillars 946 is obtained by controlling the etching time.

Next, a silicon substrate 921 for forming the micromirrors 930, torsion bars 932, and frame portion 934, is doped with impurities.

These impurities provide an etch stop effect in the etching of the silicon by an alkaline aqueous solution, and the etch stop effect is a necessary technique in the fabrication of the micromirrors 930 which require an extremely thin and accurate substrate.

The diffusion depth of the impurities is an important factor in determining the thickness of the micromirrors 930.

Specifically, the impurities consist of boron, and as a boron dopant a mixture of the boron compound $B_2O_3$ with an organic solvent is used. As this boron dopant for example the material PBF supplied by Tokyo Oka Company may be used. The boron dopant is spin-coated on the silicon substrate 921, and the film thickness of boron dopant may be adjusted by its dependence on the spin rotation conditions of the silicon substrate 921 and the viscosity of the boron dopant.

In this embodiment, if the boron dopant has a viscosity of from 50 to 100 cp, by adjusting the spin rotation conditions, the film thickness of boron dopant can be varied in the range 0.5 to 5.0 $\mu$m.

After spin coating with the boron dopant, the silicon substrate 921 may be heated in a furnace at 100 to 180° C. for 20 to 40 minutes, and the solvent of the boron dopant evaporated. In this embodiment, the silicon substrate 921 is baked for 30 minutes at 140° C. Further, by firing the silicon substrate 921 in an oxygen atmosphere for 1 to 2 hours at 400 to 800° C., the binder is removed. In this embodiment, the silicon substrate 921 is fired for 1 hour at 600° C. In the subsequent step of thermal diffusion, thermal diffusion may be carried out for 4 to 10 hours at 800 to 1200° C. in a nitrogen atmosphere. In this embodiment, thermal diffusion is carried out for 5 hours at 1100° C.

Figure 28B:
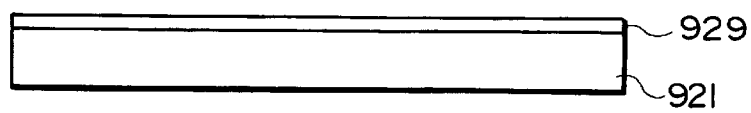

As a result, as shown in FIG. 28B, the boron of the boron dopant is thermally diffused into the silicon substrate 921, and a 1 $\mu$m boron doped layer 929 is formed.

The thickness of the boron doped layer 929 can be adjusted in this thermal diffusion step by varying the temperature and processing time.

Figure 28C:
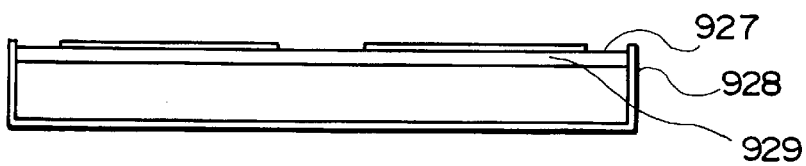

Next, by thermal oxidation of the silicon substrate 921, a 0.2 $\mu$m oxide film is formed, and in the positions where a flame portion 934 are to be formed a photolithography process and oxide film etching step are used to carry out patterning, and as shown in FIG. 28C, a glass support pattern 927 not covered by the oxide film 928 is obtained.

Figure 28D:
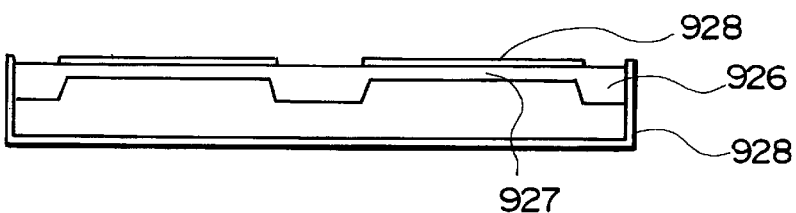

Boron doping is carried out once more, and boron diffused more deeply into the glass support pattern 927 only. At this time, the oxide film 928 acts as a barrier to the diffusing substance, and where the oxide film 928 is present, diffusion does not occur even if the diffusing substance is present thereon. For this reason, the oxide film 928 acts as a mask to allow selective boron doping. In this way, as shown in FIG. 28D, a frame portion doped layer 926 and the boron doped layer 929 can be formed.

At this time, the following relation holds between the frame portion doped layer 926 and boron doped layer 929:

Micromirror 930 deflection half-amplitude $(W/2) =$ (frame portion doped layer 926) $-$ (boron doped layer 929)

And if the deflection half-amplitude (W/2) requires 1.4 $\mu$m, the diffusion thickness of the frame portion doped layer 926 should be 2.4 $\mu$m from the above expression.

Figure 28E:
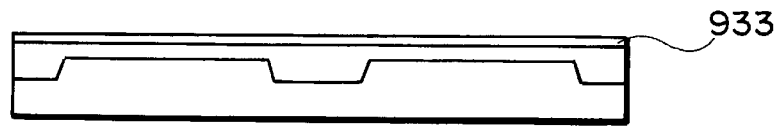

After formation of the frame portion doped layer 926, the oxide film 928 is removed with hydrofluoric acid, and to improve the optical reflectivity of the boron doped surface, an optical reflecting film 933 is formed. In concrete terms, the film is formed by vapor deposition of aluminum. This state is shown in FIG. 28E.

Next, the etched surface of the glass substrate 940 fabricated in the step shown in FIG. 28A, and the silicon substrate 921 processed as described above, are bonded by the anode bonding method.

Figure 28F:
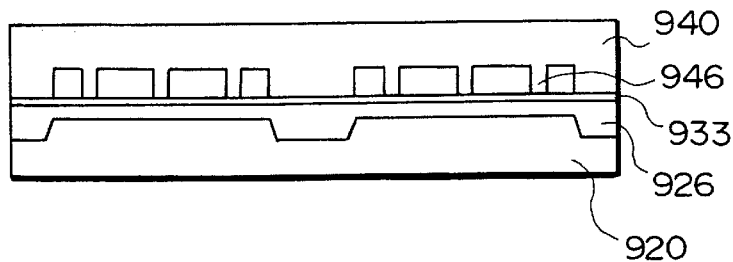

Specifically, the bonding conditions are that the two substrates 921 and 940 placed on a hot plate heated to 250° C. are bonded by applying 500 V between them. The state after bonding is shown in FIG. 28F.

Figure 28G:
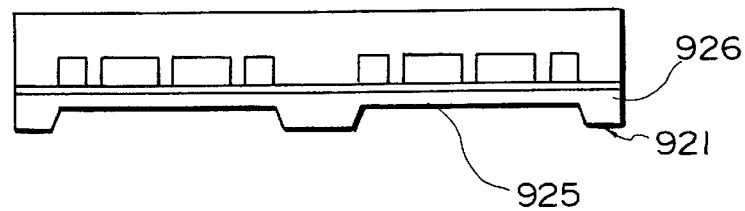

The silicon substrate 921 and glass substrate 940 bonded together are immersed in an aqueous solution of KOH heated to 80° C., and the silicon substrate 921 is subjected to wet etching. As a result, as shown in FIG. 28G, a thin silicon film 925 remained on the underside of the optical reflecting film 933.

Thereafter, using a dicing apparatus, the silicon mirror substrate 920 and glass substrate 940 bonded together are cut to a specified size.

Figure 28H:
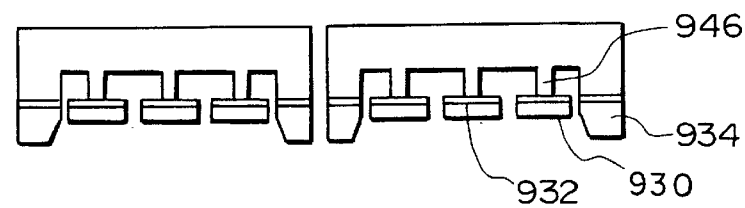

Next a resist pattern is formed on the thin silicon film 925 of the silicon mirror substrate 920 and glass substrate 940 bonded together, and the thin silicon film 925 is etched by dry etching. Thereafter, a dry resist removal process was carried out. As a result, as shown in FIG. 28H, the micromirrors 930, torsion bars 932, and frame portion 934 are formed. The reason for using dry processes for the etching step and resist removal step is to avoid the problems with wet processing such as adhering debris remaining after resist removal, resist remaining on overhang portions, and drying marks.

Figure 28I:
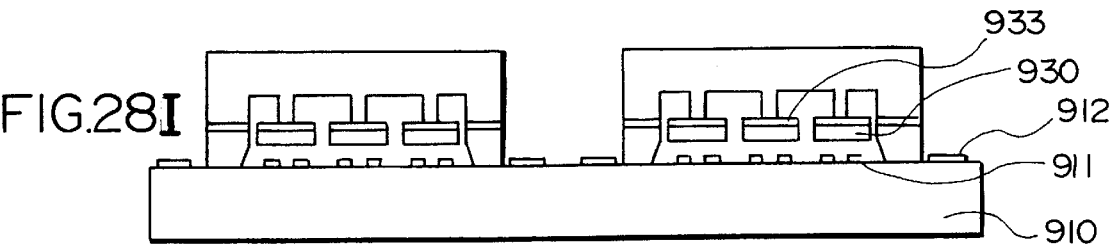

Next, the silicon circuit substrate 910 provided with the drive circuit for the spatial light modulator and the bonded glass-silicon unit processed in FIG. 28H are bonded, and the structure shown in FIG. 28I is obtained. At this point, the frame portion 934 is accurately positioned so as to be coupled to the appropriate position of the silicon drive circuit of the silicon circuit substrate 910 before bonding.

In this bonding, pad portions of the drive circuit are gold plated, and the phenomenon is utilized that this gold plating and the silicon of the silicon circuit substrate 910 form eutectic crystals at approximately 320° C., to bond. By using this bonding method, variations in gap dimensions due to uneven spreading of an adhesive or the like are avoided, and a high gap accuracy is obtained. In place of this, it is also possible to use a spin coating of a conductive adhesive, and to achieve the bonding by means of the evenly spread conductive adhesive.

Thereafter, by dicing along the broken line shown in FIG. 28I, individual spatial light modulator elements are separated.

Finally, appropriate wiring of the silicon circuit substrate 910 provided with the drive circuit is carried out, to complete the fabrication of the spatial light modulator.

Ninth Embodiment

In the eighth embodiment described above, the micromirrors are fabricated from silicon, but as described in this ninth embodiment, a metal film can also be used. FIGS. 29A to 29J show the fabrication process of this ninth embodiment of the spatial light modulator. The description here does not include detailed conditions of the steps in the process, but the corresponding conditions described in the first and second embodiments may be used.

Figure 29A:
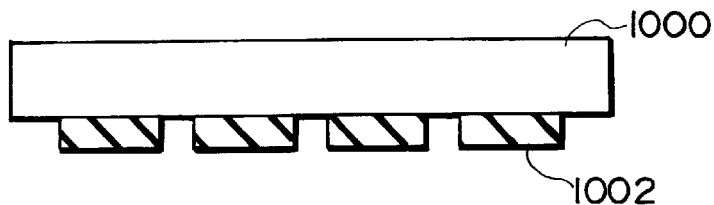
Figure 29B:
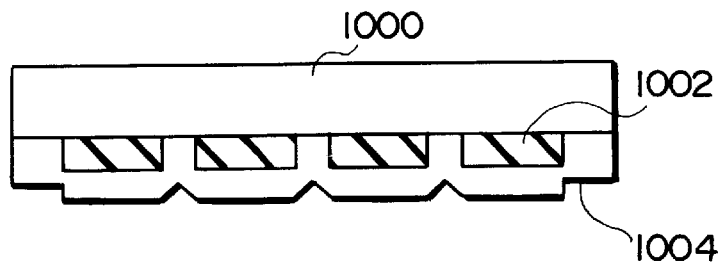
Figure 29C:
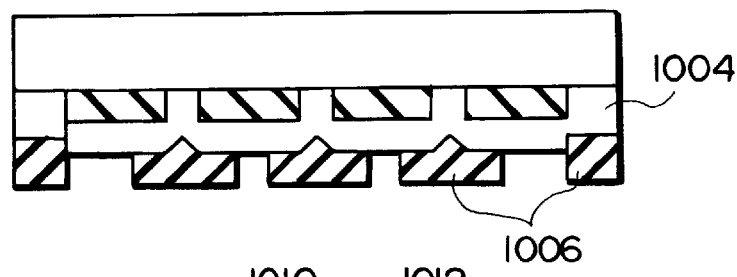

First, as shown in FIG. 29A, on a glass substrate 1000 a first resist pattern 1002 is formed. Next, as shown in FIG. 29B, a first metal film 1004 of aluminum or the like is formed by vapor deposition, sputtering, or another method on the surface of the glass substrate 1000 and resist pattern 1002. Then as shown in FIG. 29C, in order to etch the first metal film 1004 a second resist pattern 1006 is formed on the first metal film 1004. It should be noted that in the ninth embodiment, first to fourth resist patterns 1002, 1006, 1016, 1020 are used, and for the second resist pattern 1006 only, post-baking is not carried out after development.

Figure 29D:
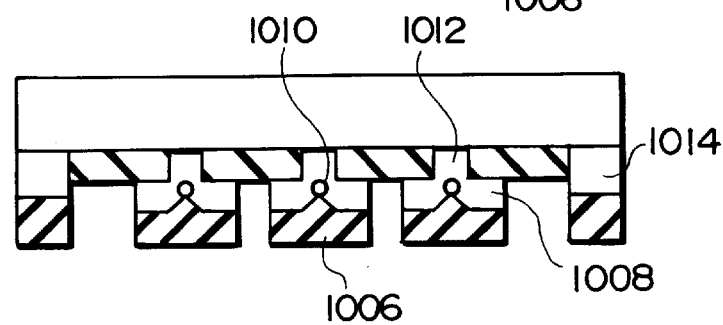

Next, as shown in FIG. 29D, using the second resist pattern 1006 as a mask, the first metal film 1004 is etched. At this point, micromirrors 1008, torsion bars 1010, and pillars 1012 are formed. Furthermore, on the periphery of the glass substrate 1000, a first rim 1014 is formed. This first rim 1014 supports both ends of the torsion bars 1010.

Figure 29E:
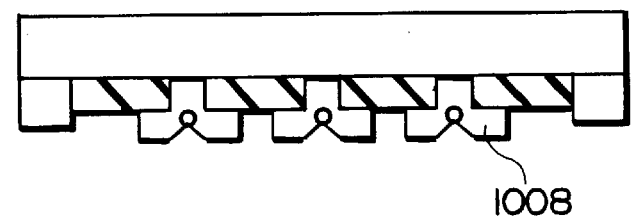

The remaining second resist pattern 1006 is exposed, for example by irradiated ultraviolet light, and thereafter developed. At the time of this development, only the second resist pattern 1006, which has not been subject to post-baking, is removed as shown in FIG. 29E.

Figure 29F:
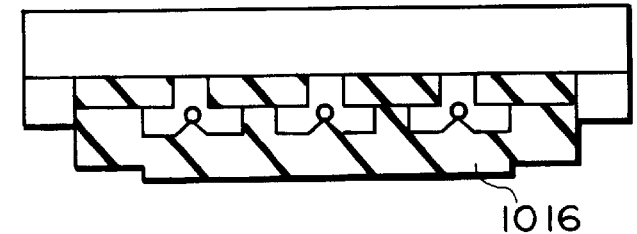

Next, in order to extend the first rim 1014 to form a second rim 1022 (see FIG. 29H), as shown in FIG. 29F, a third resist pattern 1016 is formed.

After this, as shown in FIG. 29G, a second metal film 1018 of aluminum or the like is formed by vapor deposition or sputtering on the first rim 1014 and third resist pattern 1016. Then on the second metal film 1018, a fourth resist pattern 1020 is formed on the second metal film 1018, to act as an etching mask for the second metal film 1018.

Then, as shown in FIG. 29H, the second metal film 1018 is etched, whereby the first rim 1014 is extended to form a second rim 1022.

All resist patterns, 1002, 1016 and 1020, remaining on the glass substrate 1000 are removed, whereby as shown in FIG. 29I the glass substrate 1000 provided with the micromirrors 1008, torsion bars 1010, pillars 1012, and second rim 1022, all formed of metal, is completed.

On the other hand, on the surface of a silicon circuit board 1030 provided with an SRAM, as shown in FIG. 29J, are formed drive electrodes 1032 for driving the micromirrors 1008, gold electrodes 1034 to be bonded to the second rim 1022, and terminals 1036. The gold electrodes 1034 on this silicon circuit board 1030 and the second rim 1022 formed on the glass substrate 1000 are bonded by the Au—Al diffusion bonding method. The temperature for this bonding is set to be 100 to 200° C., and the bonding time at least 1 minute. In place of this diffusion bonding, bonding with a uniformly spread conductive adhesive may also be used.

Finally, wiring to the terminals 1036 of the silicon circuit board 1030 is carried out to complete the spatial light modulator.

What is claimed is:

1. A spatial light modulator having a conductive silicon mirror substrate doped with impurities and an electrode substrate are bonded integrally wherein said silicon mirror substrate, comprises:

a plurality of micromirrors arranged in one of a line and matrix and having reflective layers formed on one surface; and a torsion bar coupling said micromirrors in one direction;

at least one said electrode substrate comprises:

a depression in a central region thereof;

a rim around the periphery thereof;

sets of electrodes formed within said depression in positions corresponding to said micromirrors and driving said micromirrors in an inclining manner by means of a coulomb force; and pillars projecting from said depression in positions corresponding to an interval between two of said micromirrors adjacent in said one direction; and wherein at least intermediate portions of said at least one torsion bar on said silicon mirror substrate are opposite said pillars of said electrode substrate, and said silicon mirror substrate and said electrode substrate are bonded.

2. The spatial light modulator of claim 1, wherein said electrode substrate is formed from a glass electrode substrate including an alkali metal; and said glass electrode substrate and said silicon mirror substrate are anode-bonded.

3. The spatial light modulator of claim 1, wherein the entire surface of the reflective layers formed on said micromirrors is formed as a flat surface reflecting impinging light with an angle of reflection equal to the angle of incidence.

4. The spatial light modulator of claim 1, wherein said sets of electrodes are formed as sets of transparent electrodes.

5. The spatial light modulator of claim 1, wherein an insulating film is formed on the surface where said micromirrors are opposite said sets of electrodes.

6. The spatial light modulator of claim 5, wherein the surface of said sets of electrodes where said electrodes oppose said insulating film formed on said micromirrors is formed to be rough.

7. The spatial light modulator of claim 6, wherein projections of height at least 200 Angstroms are formed on said surface of said sets of electrodes to obtain said rough surface.

8. The spatial light modulator according to claim 5, wherein insulating projections are formed on said insulating film and at positions displaced from said at least one torsion bar.

9. The spatial light modulator of claim 5, further comprises an insulating stopper projecting from the base of said depression of said electrode substrate to a height less than the height of said rim and said pillars, said insulating stopper abutting said micromirrors when driven in an inclining manner to determine the deflection angle.

10. The spatial light modulator of claim 1, wherein a transparent cover plate is bonded on said silicon mirror substrate so as to cover said silicon mirror substrate and in a position non-interference with said micromirrors driven in an inclining manner.

11. An electronic device including the spatial light modulator of claim 1.

12. A spatial light modulator, comprising:

a glass substrate on which at least one conductive torsion bar coupling a plurality of conductive micromirrors in one direction is supported by pillars, and on which a conductive frame portion fixing both ends of said at least one torsion bar is formed; and a circuit substrate on which a plurality of pairs of electrodes opposite each of said micromirrors and a circuit element energizing said plurality of pairs of electrodes are formed;

and wherein said frame portion of said glass substrate and said circuit substrate are bonded.

13. The spatial light modulator of claim 12, wherein said micromirrors and said at least one torsion bar are formed of silicon.

14. The spatial light modulator of claim 12, wherein said micromirrors and said at least one torsion bar are formed of a metal.

15. An electronic device including the spatial light modulator of claim 12.

* * * * *